(12) United States Patent
Suzuki

(10) Patent No.: US 10,855,945 B2
(45) Date of Patent: Dec. 1, 2020

(54) IMAGE PROCESSING APPARATUS AND CONTROL METHOD THEREOF

(71) Applicant: CANON KABUSHIKI KAISHA, Tokyo (JP)

(72) Inventor: Soichiro Suzuki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/587,677

(22) Filed: Sep. 30, 2019

(65) Prior Publication Data

US 2020/0106981 A1  Apr. 2, 2020

(30) Foreign Application Priority Data

Oct. 1, 2018 (JP) ................................ 2018-186872

(51) Int. Cl.
| | | |
|---|---|---|
| *H04N 5/378* | (2011.01) | |
| *H04N 5/374* | (2011.01) | |
| *H04N 5/341* | (2011.01) | |
| *H04N 5/345* | (2011.01) | |
| *H04N 5/376* | (2011.01) | |
| *G06T 1/60* | (2006.01) | |

(52) U.S. Cl.
CPC ........... *H04N 5/378* (2013.01); *H04N 5/3452* (2013.01); *H04N 5/374* (2013.01); *H04N 5/376* (2013.01); *G06T 1/60* (2013.01)

(58) Field of Classification Search
CPC ...... H04N 5/341; H04N 5/345; H04N 5/3452; H04N 5/3454; H04N 5/3456; H04N 5/374; H04N 5/3745; H04N 5/376; H04N 5/378; G06T 1/60
See application file for complete search history.

(56) References Cited

U.S. PATENT DOCUMENTS

| | | | | |
|---|---|---|---|---|
| 8,792,036 | B2* | 7/2014 | Uchida | H04N 5/3653 348/308 |
| 8,809,759 | B2* | 8/2014 | Mo | H04N 5/355 250/208.1 |
| 2005/0224842 | A1* | 10/2005 | Toyama | H01L 27/14831 257/225 |
| 2018/0220058 | A1* | 8/2018 | Takahashi | H04N 5/343 |
| 2020/0036927 | A1* | 1/2020 | Tajimi | H04N 9/04511 |

FOREIGN PATENT DOCUMENTS

JP  2013-062714 A  4/2013

* cited by examiner

*Primary Examiner* — Ngoc Yen T Vu
(74) *Attorney, Agent, or Firm* — Cowan, Liebowitz & Latman, P.C.

(57) ABSTRACT

An apparatus takes data read out in parallel from m rows ($2 \leq m < M$) of a region, of an image sensor having M×N pixels, and stores n columns' worth ($2 \leq n < N$) of the read-out data in first memory. The apparatus stores the M×N pixels' worth of data in second memory by storing m×n pixels' worth of data in units of o×p pixels ($2 \leq o < m$, $2 \leq p \leq n$), and transfers the M×N pixels' worth of data, to third memory in the units of o×p pixels. The apparatus outputs the data stored in the third memory one row at a time so that the data are arranged in the original order.

12 Claims, 21 Drawing Sheets

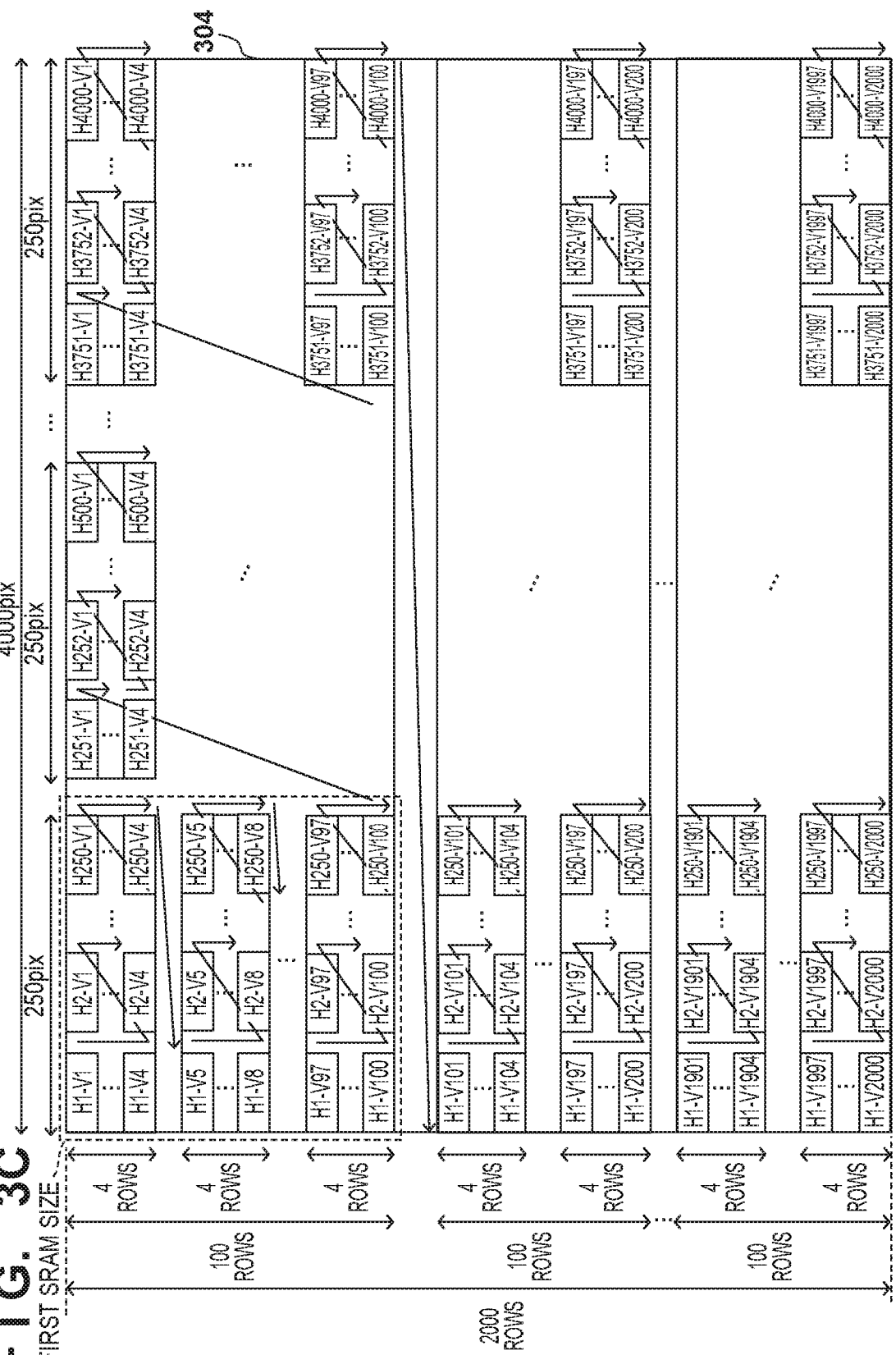

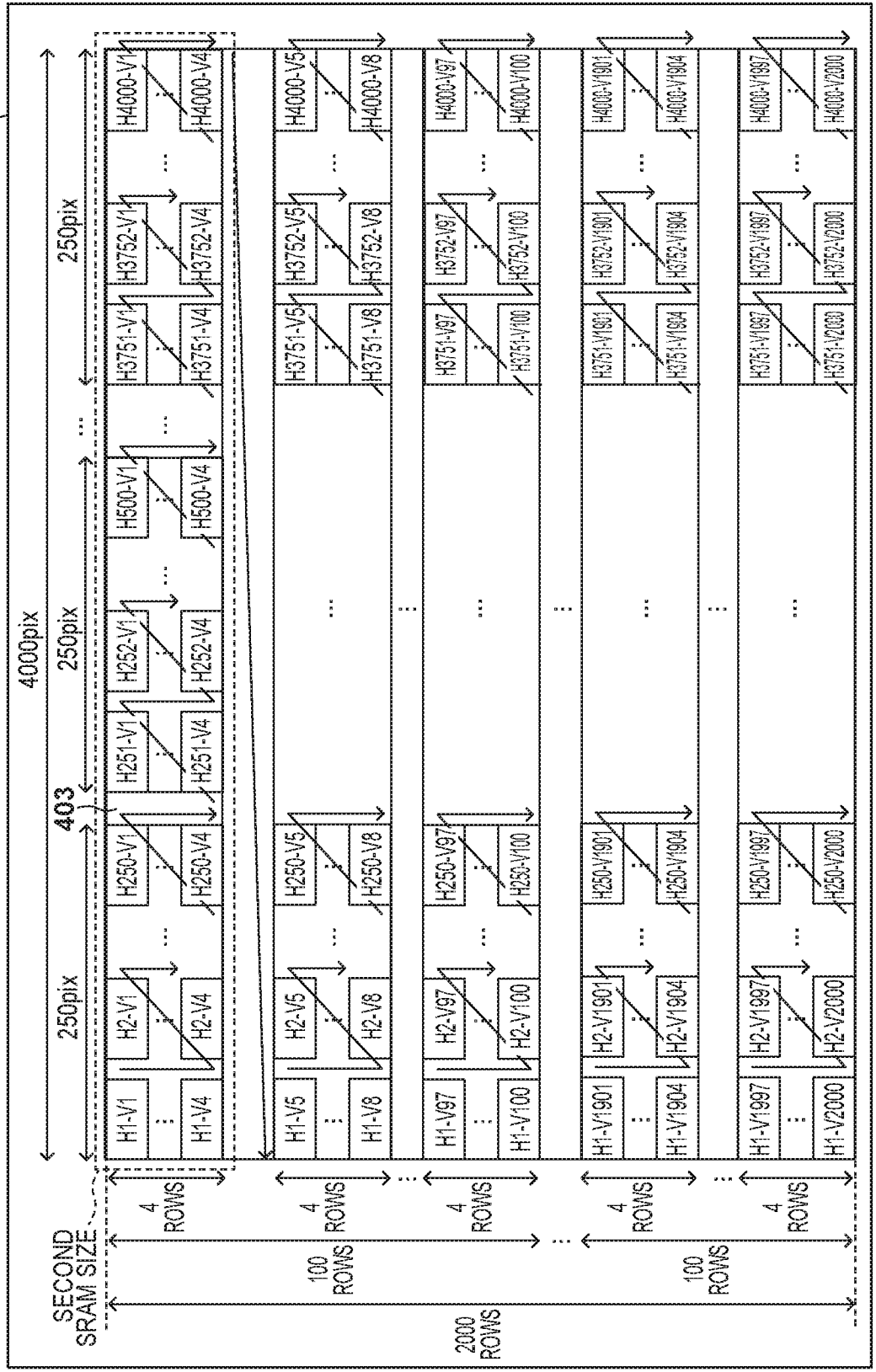

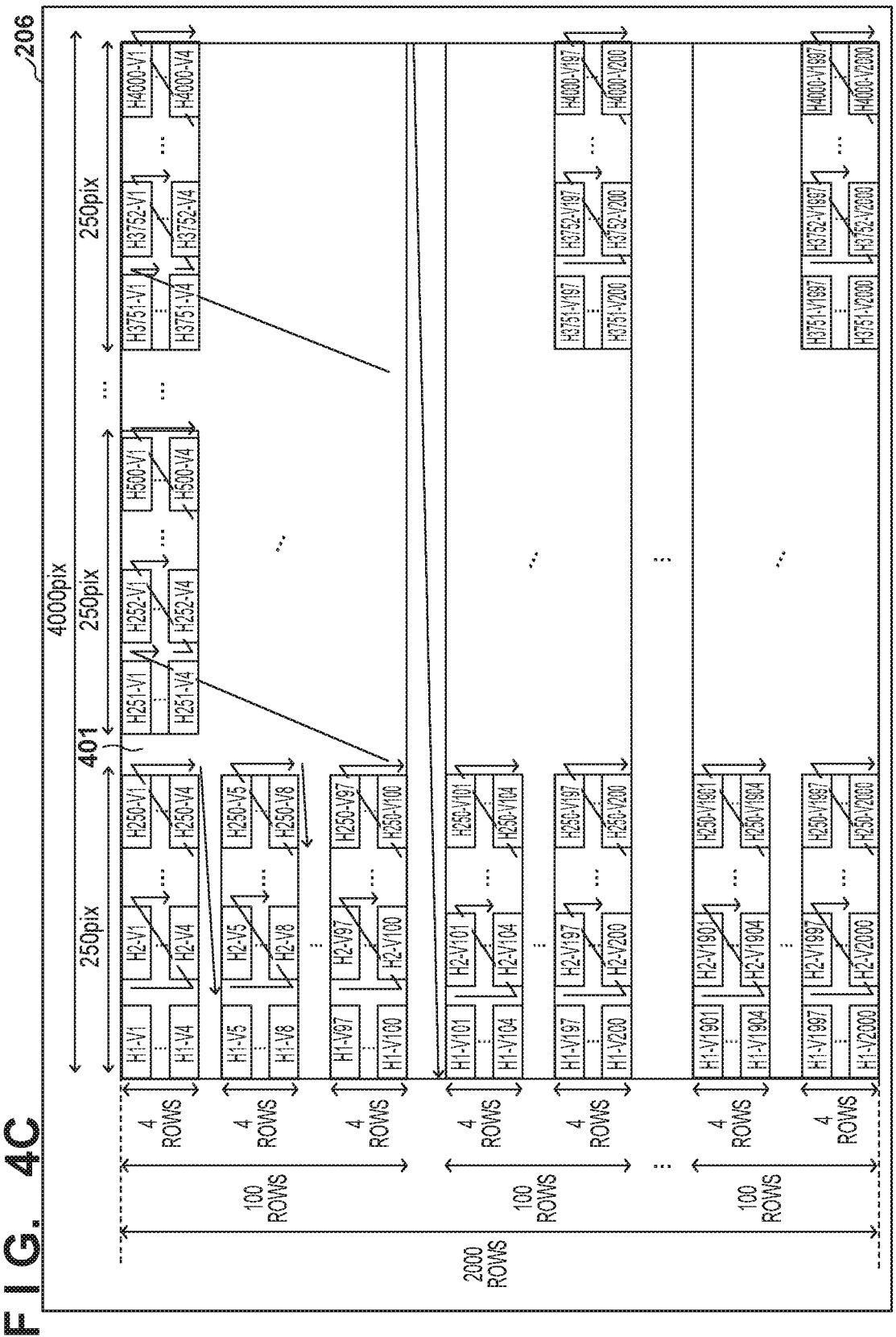

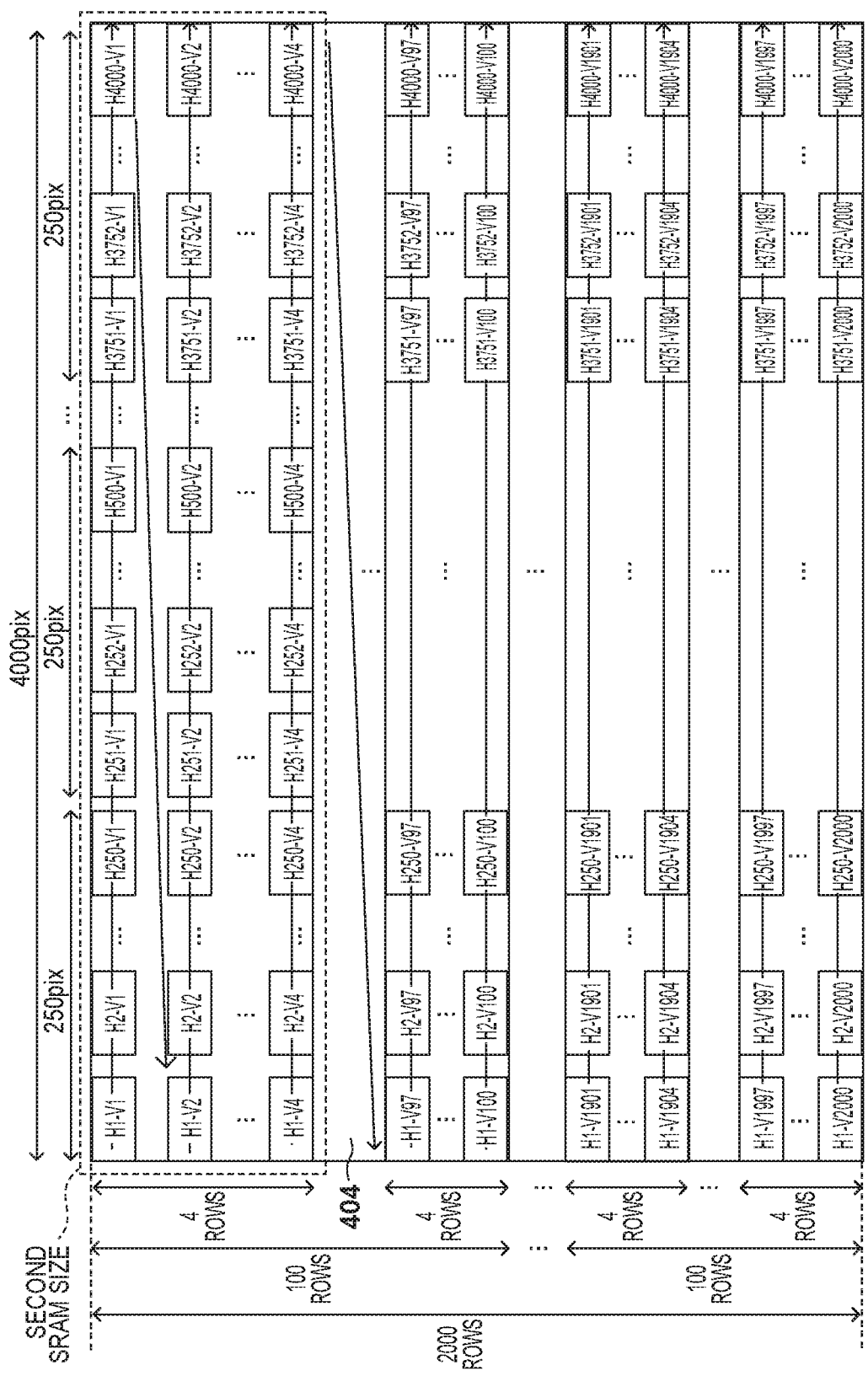

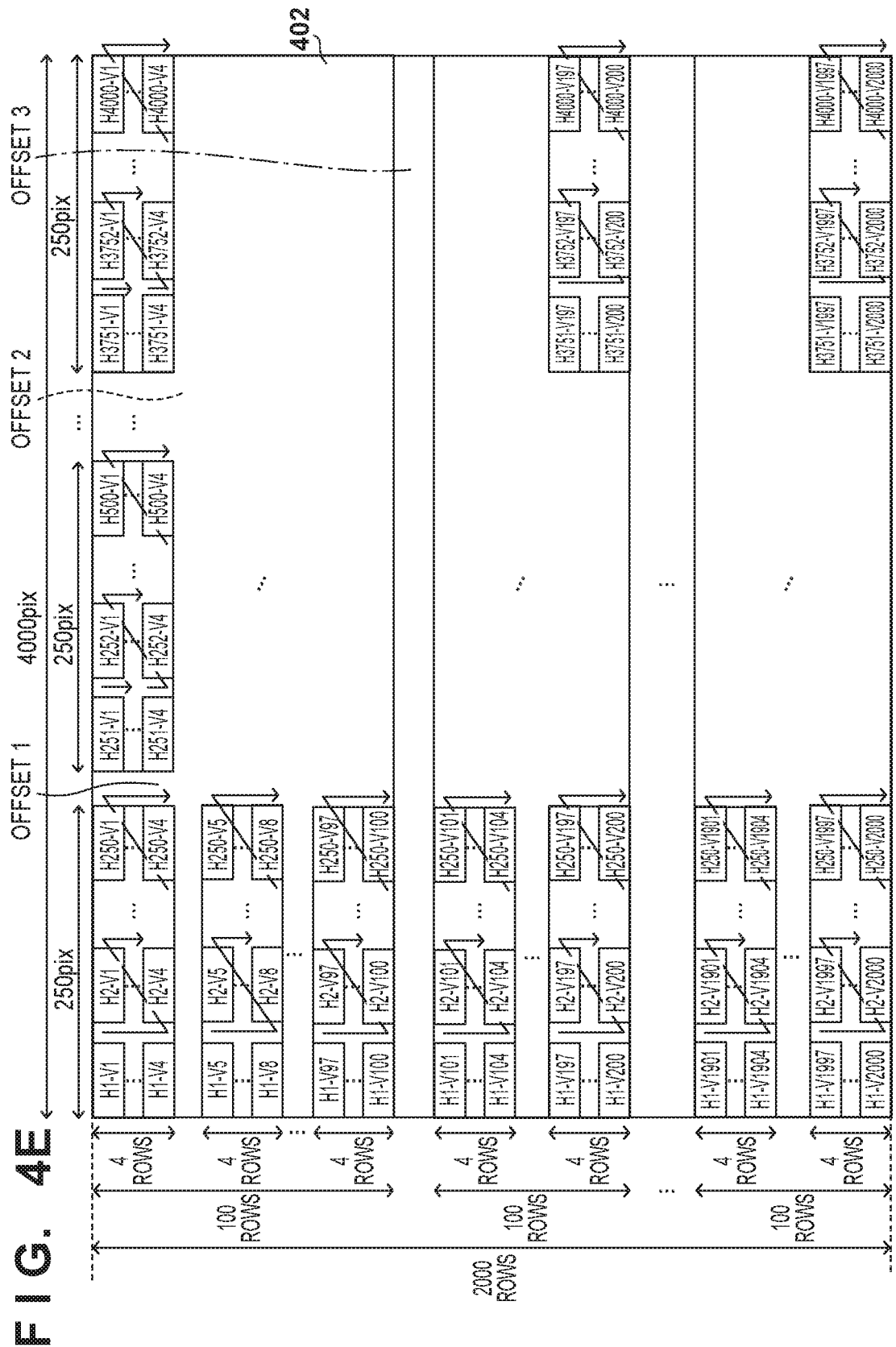

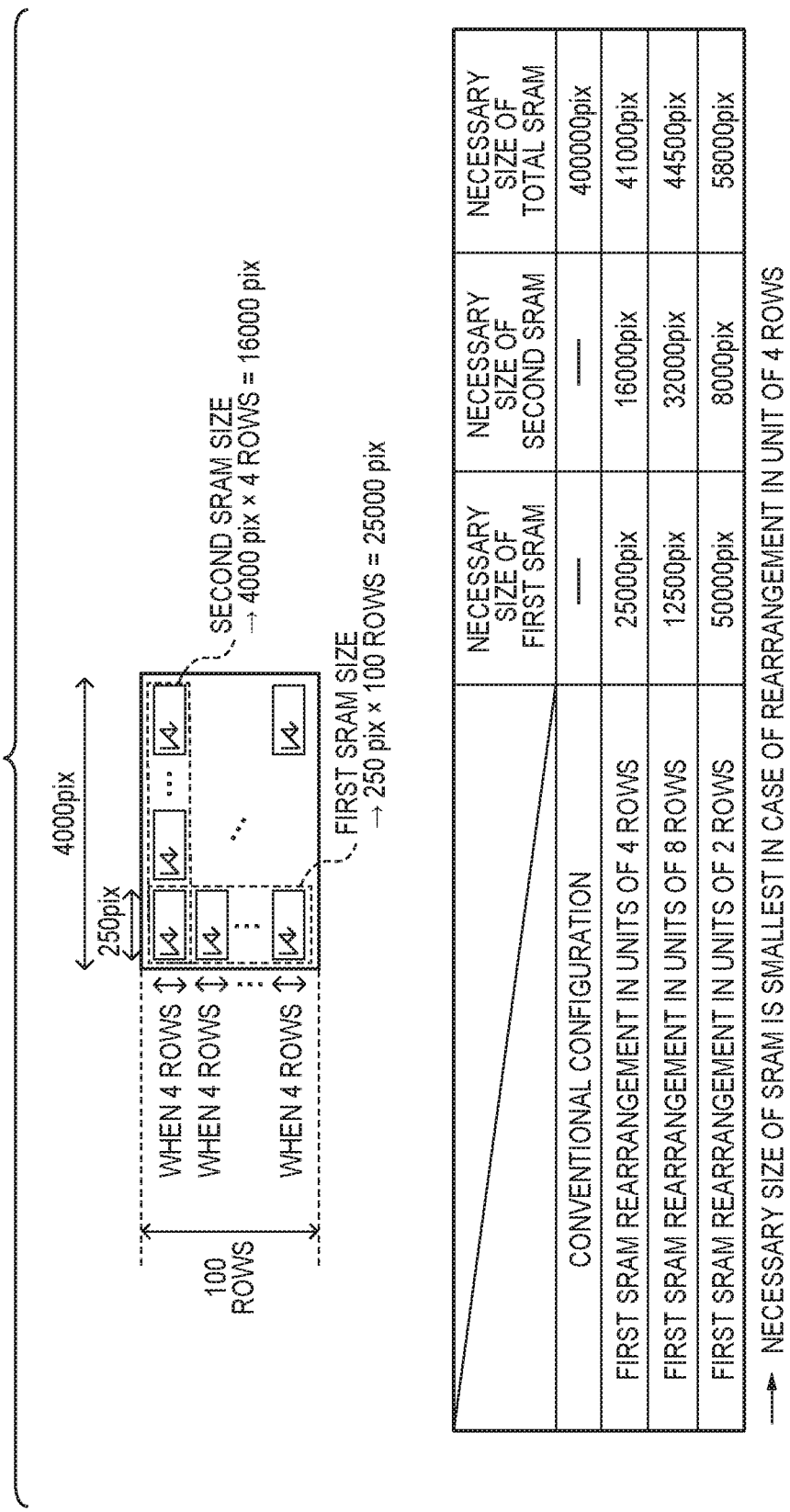

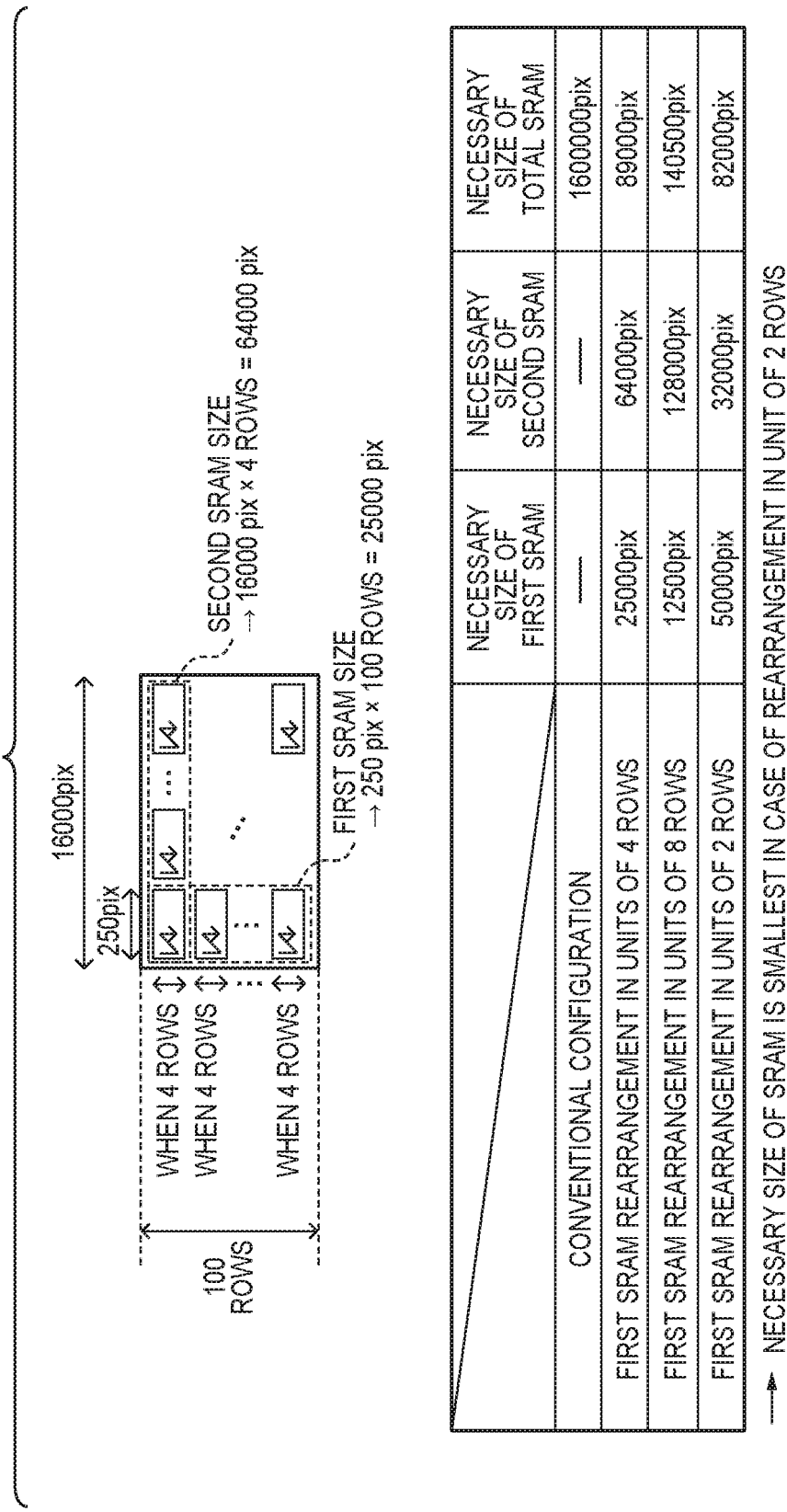

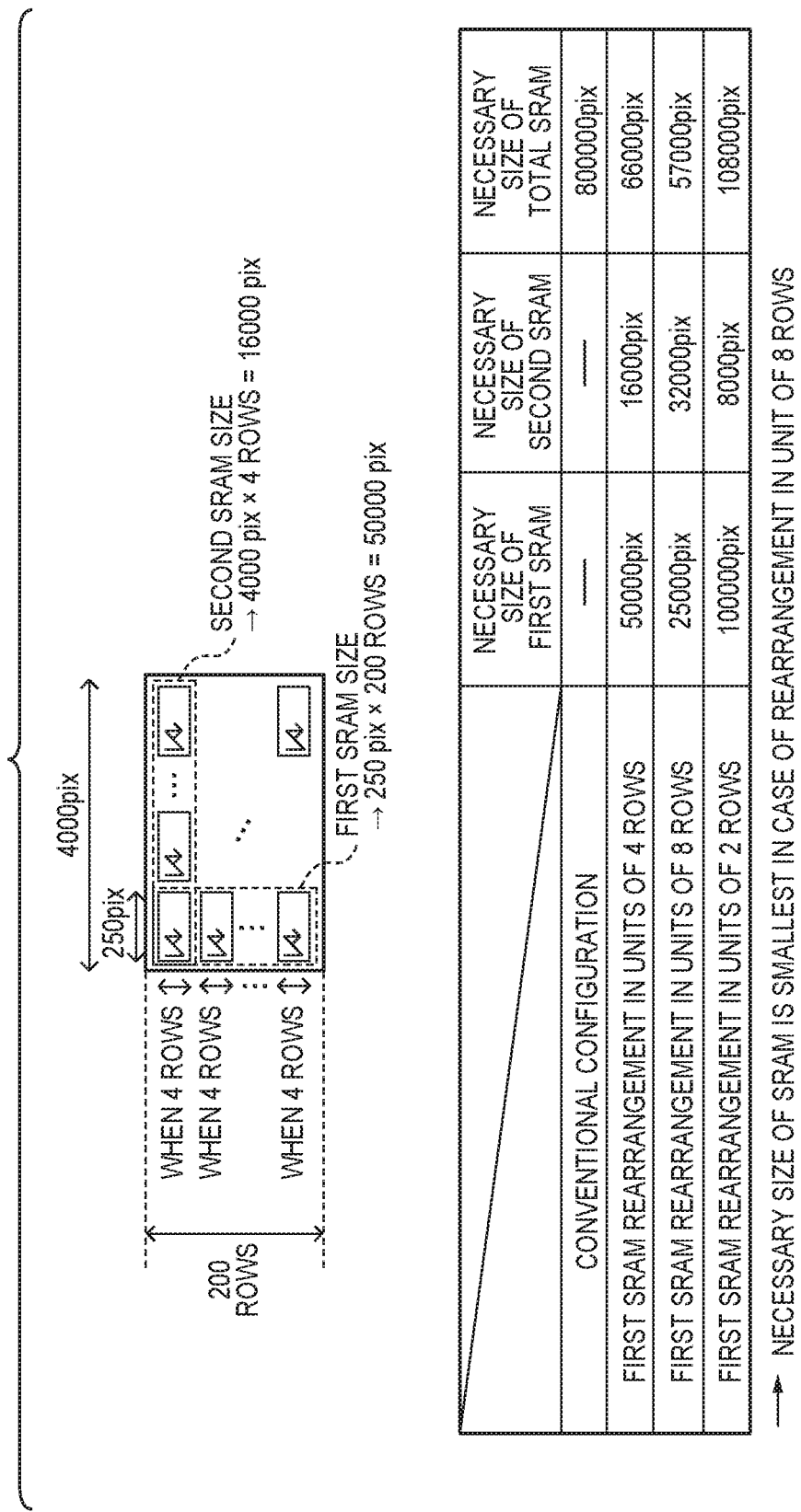

IMAGE PROCESSING APPARATUS AND CONTROL METHOD THEREOF

BACKGROUND OF THE INVENTION

Field of the Invention

The present invention relates to image processing apparatuses and control methods thereof.

Description of the Related Art

Various methods have been proposed with respect to accelerating data readout from image sensors. For example, a method is known in which data from a plurality of rows is read out in parallel. However, when a circuit in a later stage cannot process the data from a plurality of rows all at once, it is necessary to rearrange the data from the plurality of rows using a memory, in accordance with the unit by which the circuit in the later stage processes that data (Japanese Patent Laid-Open No. 2013-62714).

According to Japanese Patent Laid-Open No. 2013-62714, Static Random Access Memory (SRAM) having a capacity equal to the number of rows to be read out in parallel is required in order to rearrange the data. As a result, as the number of rows to be read out in parallel increases, the circuit scale and cost for rearranging the data increases, the processing rate of the circuit in the later stage drops, and so on.

SUMMARY OF THE INVENTION

The present invention at least reduces the such problems with the past techniques, and provides an image processing apparatus, and a control method thereof, capable of rearranging data of a plurality of rows read out in parallel from an image sensor, at high speed and with a small circuit scale.

According to an aspect of the present invention, there is provided an image processing apparatus comprising: a first rearrangement control circuit that takes data read out in parallel from m rows ($2 \leq m < M$) of a region, of an image sensor, constituted by M rows and N columns of pixels, and stores n columns' worth ($2 \leq n < N$) of the read-out data in first memory; a transfer control circuit that: stores the M rows×N columns of pixels' worth of data in second memory by repeatedly storing m rows×n columns of pixels' worth of data, which is stored in the first memory, in the second memory in units of o rows×p columns of pixels ($2 \leq o < m$, $2 \leq p \leq n$), and transfers, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and a second rearrangement control circuit that, by outputting the data stored in the third memory one row at a time, outputs the data in the same sequence as 1 row×N columns of pixels in the image sensor.

According to another aspect of the present invention, there is provided an image capturing apparatus comprising: an image sensor; an image processing apparatus that processes data read out from the image sensor, wherein the image processing apparatus comprises: a first rearrangement control circuit that takes data read out in parallel from m rows ($2 \leq m < M$) of a region, of an image sensor, constituted by M rows and N columns of pixels, and stores n columns' worth ($2 \leq n < N$) of the read-out data in first memory; a transfer control circuit that: stores the M rows×N columns of pixels' worth of data in second memory by repeatedly storing m rows×n columns of pixels' worth of data, which is stored in the first memory, in the second memory in units of o rows×p columns of pixels ($2 \leq o < m$, $2 \leq p \leq n$), and transfers, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and a second rearrangement control circuit that, by outputting the data stored in the third memory one row at a time, outputs the data in the same sequence as 1 row×N columns of pixels in the image sensor; and a signal processing circuit that processes data output by the second rearrangement control circuit of the image processing apparatus.

According to a further aspect of the present invention, there is provided an image processing method executed by an image processing apparatus, the method comprising: obtaining data read out in parallel from m rows ($2 \leq m < M$) of a region, of an image sensor, constituted by M rows and N columns of pixels, and storing n columns' worth ($2 \leq n < N$) of the read-out data in first memory; storing the M rows×N columns of pixels' worth of data in second memory by repeatedly storing m rows×n columns of pixels' worth of data, which is stored in the first memory, in the second memory in units of o rows×p columns of pixels ($2 \leq o < m$, $2 \leq p \leq n$); transferring, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and by outputting the data stored in the third memory one row at a time, outputting the data in the same sequence as 1 row×N columns of pixels in the image sensor.

According to another aspect of the present invention, there is provided a non-transitory computer-readable medium that stores a program, wherein the program, when executed by one or more processors, causes the one or more processors to function as an image processing apparatus comprising: a first rearrangement control unit that takes data read out in parallel from m rows ($2 \leq m < M$) of a region, of an image sensor, constituted by M rows and N columns of pixels, and stores n columns' worth ($2 \leq n < N$) of the read-out data in first memory; a transfer control unit that: stores the M rows×N columns of pixels' worth of data in second memory by repeatedly storing m rows×n columns of pixels' worth of data, which is stored in the first memory, in the second memory in units of o rows×p columns of pixels ($2 \leq o < m$, $2 \leq p \leq n$), and transfers, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and a second rearrangement control unit that, by outputting the data stored in the third memory one row at a time, outputs the data in the same sequence as 1 row×N columns of pixels in the image sensor.

Further features of the present invention will become apparent from the following description of exemplary embodiments with reference to the attached drawings.

BRIEF DESCRIPTION OF THE DRAWINGS

FIGS. 3A to 3C are diagrams illustrating data rearrangement operations according to the first embodiment.

FIGS. 4A to 4E are diagrams illustrating data rearrangement operations according to the first embodiment.

FIGS. 7A to 7C are diagrams illustrating a variation on the first embodiment.

DESCRIPTION OF THE EMBODIMENTS

Exemplary embodiments of the present invention will now be described in detail in accordance with the accompanying drawings. The embodiments described here are to be taken as examples only, and are not intended to limit the scope of the present invention. For example, the following describes embodiments in which the present invention is applied in a digital camera. However, the digital camera is only an example of an image processing apparatus in which the present invention can be applied. The present invention can be implemented in any electronic device that can handle data read out from an image sensor. A personal computer, a tablet terminal, a mobile phone, a game console, a dashboard camera, a robot, a drone, and the like can be given as examples of such an electronic device aside from an image capturing apparatus such as a digital camera or a digital video camera. The electronic device is not limited to these examples, however.

First Embodiment

Figure 2:
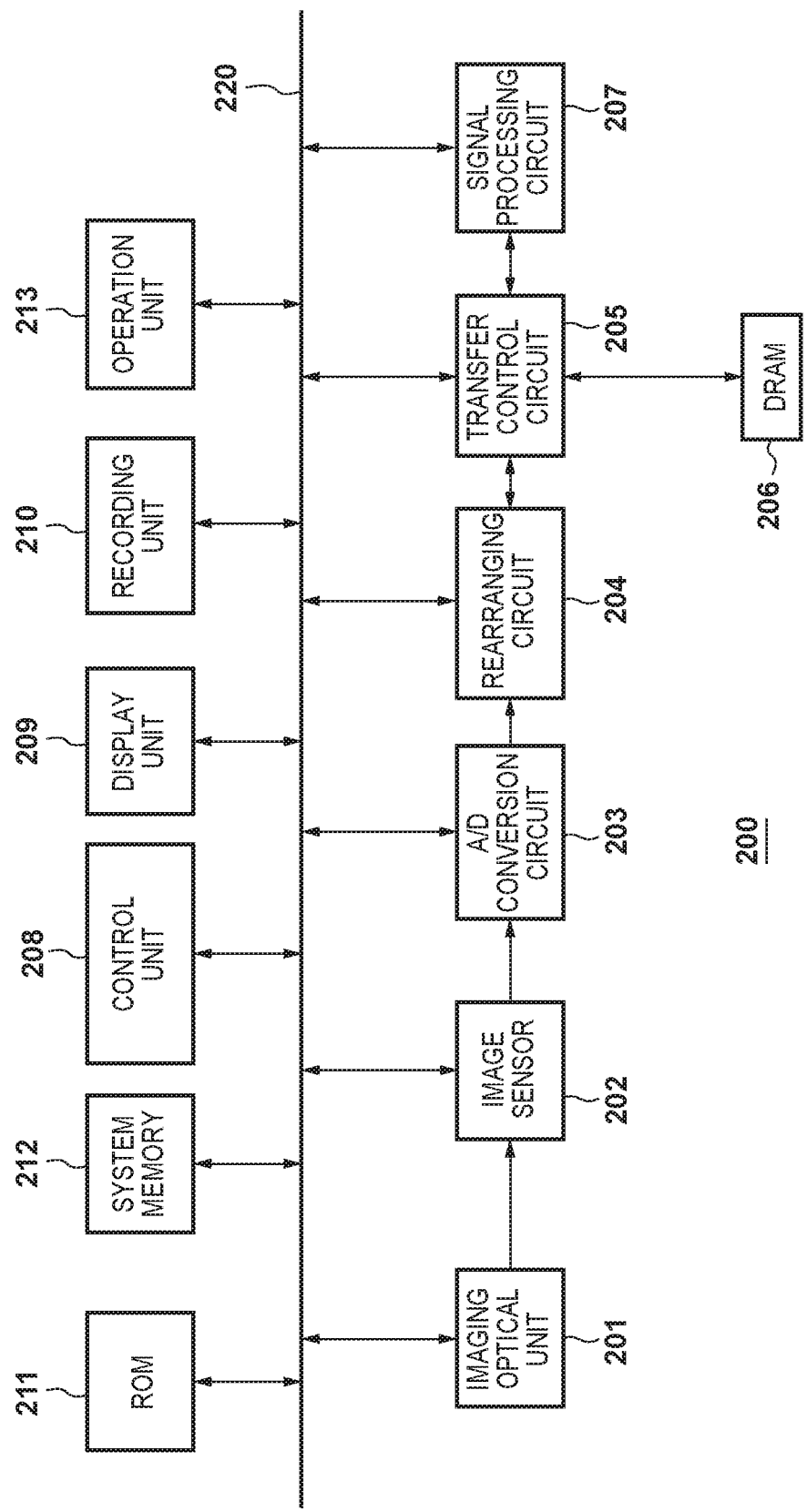
FIG. 2 is a block diagram illustrating an example of the functional configuration of a digital camera serving as an example of an image processing apparatus according to an embodiment.

FIG. 2 is a block diagram illustrating an example of the functional configuration of a digital camera 200 serving as an example of an image processing apparatus according to a first embodiment of the present invention.

An imaging optical unit 201 includes a plurality of lenses including a focus lens, an aperture stop, and driving circuits for the lens, the aperture stop, and the like. The imaging optical unit 201 may or may not be removable from the digital camera 200.

An image sensor 202 is a CMOS image sensor, for example, and includes a pixel array in which pixels, each including a photoelectric conversion unit, are arranged two-dimensionally, a horizontal scanning circuit and a vertical scanning circuit that supply control signals to the pixel array, and the like. The image sensor 202 has a mode in which signals are read out from the pixel array concurrently (in parallel) in units of a plurality of rows. In this mode, the data of one horizontally-arranged pixel (column)×a plurality of vertically-arranged pixels (rows) is read out from the image sensor 202. In this specification, reading out signals or data "concurrently" from a plurality of rows in the pixel array means that the readout of the signals or data from the rows is executed in parallel. It is not necessary for the timing of the readout of the signals or data from the rows to coincide exactly.

An A/D conversion circuit 203 converts an analog image signal read out from the image sensor 202 into digital image data. Note that the A/D conversion circuit 203 may be included in the image sensor 202. The same number of A/D conversion circuits 203 as there are pixel data output concurrently from the image sensor 202 are provided. It is assumed here that the data read out concurrently (in parallel) from a plurality of rows is output in series, and thus there is a single A/D conversion circuit 203.

A rearranging circuit 204 takes the plurality of rows of image sensor data read out concurrently and rearranges that data in the same order as if it has been read out one row at a time. A transfer control circuit 205 controls the writing and reading out of the image data, which has been rearranged by the rearranging circuit 204, into and from Dynamic Random Access Memory (DRAM) 206. The transfer control circuit 205 controls the data transfer so that the burst length of the image data transferred to the DRAM 206 with a single access by the rearranging circuit 204 is no greater than a burst length set by a control unit 208.

A signal processing circuit 207 applies various types of image processing to the image data. The image processing applied by the signal processing circuit 207 includes noise reduction processing, white balance adjustment processing, color interpolation processing, AF evaluation value and/or AE evaluation value generation processing, object region detection and/or tracking processing, encoding processing, decoding processing, and the like. These are merely examples, however, and one or more need not be included, or other processes may be included.

The control unit 208 is programmable processor such as a CPU, for example. The control unit 208 realizes the functions of the digital camera 200 by loading programs stored in ROM 211 into system memory 212 and executing those programs.

A display unit 209 is a touch screen, for example, and is a display device that displays images obtained through shooting, information of the digital camera 200, a graphical user interface (GUI), and the like. Note that the digital camera 200 according to the present embodiment causes the display unit 209 to function as an electronic viewfinder (EVF) by continuously displaying a shot moving image in the display unit 209 when standing by to shoot, when shooting a moving image, and the like.

A recording unit 210 writes data into a recording medium, such as a memory card, reads out data recorded in the recording medium, and the like.

The ROM 211 stores programs that can be executed by the processor constituting the control unit 208, various setting values, unique information of the digital camera 200, GUI data, and the like. The ROM 211 may be rewritable.

The system memory 212 is used to execute programs, as video memory for the display unit 209, as buffer memory, and the like.

"Operation unit 213" is the collective name for a group of input devices, such as switches, buttons, keys, a touch panel, and the like through which a user inputs instructions to the digital camera 200. Inputs made through the operation unit 213 are detected by the control unit 208 over a bus 220, and the control unit 208 executes control necessary for realizing operations corresponding to the detected inputs.

The bus 220 connects the above-described blocks 201 to 205 and 207 to 213 so that the blocks can communicate with each other.

Figure 1:
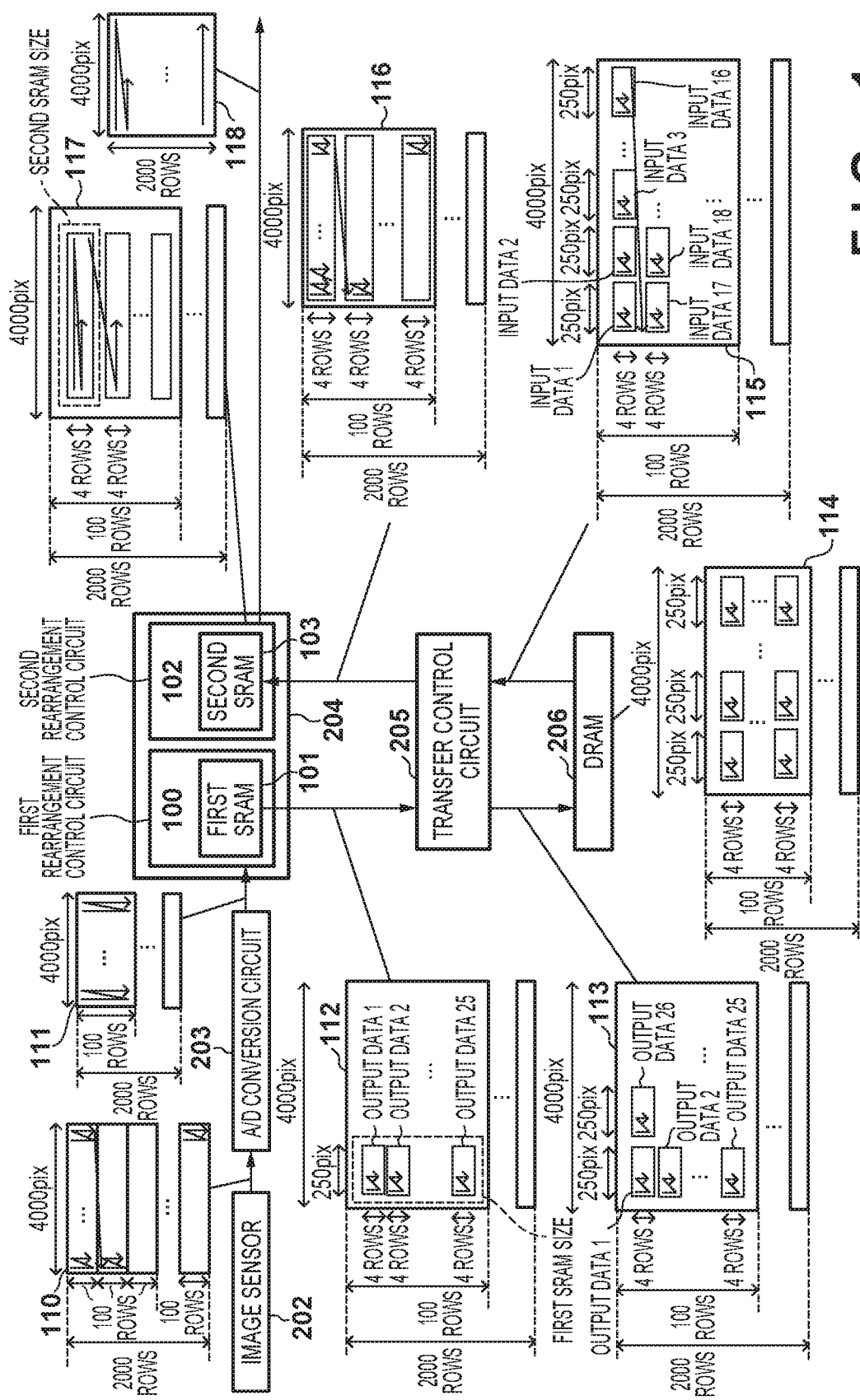
FIG. 1 is a diagram illustrating data rearrangement operations according to a first embodiment.

FIG. 1 is a diagram illustrating a configuration, among that illustrated in FIG. 2, for taking a plurality of rows of data read out concurrently from an image sensor and rearranging that data in the same order as if it has been read out one row at a time.

It is assumed here that of the pixels constituting the pixel array in the image sensor 202, data is read out concurrently from m rows ($2 \leq m < M$) of a region constituted by M rows and N columns of pixels. Specifically, it is assumed that 100 rows at a time are read out concurrently from a region constituted by 4000 horizontally-arranged pixels (columns) and 2000 vertically-arranged pixels (rows).

110 schematically illustrates the sequence of the data output from the image sensor 202. As indicated by 110, when 100 rows are read out concurrently, the readout position advances one pixel at a time in the horizontal direction each time 100 pixels in the vertical direction are read out. 111 schematically indicates the sequence of data input to the rearranging circuit 204, which is the same order as that indicated by 110, it is assumed here that 100 rows of pixels' worth of data read out concurrently is output in series, one row at a time from the top row, in order.

The rearranging circuit 204 includes a first rearrangement control circuit 100 and a second rearrangement control circuit 102. The first rearrangement control circuit 100 includes first SRAM 101. The second rearrangement control circuit 102 includes second SRAM 103 (third memory). The first SRAM 101 (first memory) has a capacity that can store m rows×n columns' ($2 \leq n < N$) of pixels' worth of data. In other words, the first SRAM 101 stores n columns' ($2 \leq n < N$) worth of data read out concurrently from m rows ($2 \leq m < M$) in a region constituted by M rows and N columns of pixels in the image sensor 202. It is assumed here that the first SRAM 101 has a capacity that can store 100 rows×250 columns of pixels' worth of data. Furthermore, the second SRAM 103 has a capacity that can store o rows×M columns' ($2 \leq o < m$) of pixels' worth of data.

The first rearrangement control circuit 100 outputs, to the transfer control circuit 205, m rows×n columns of pixels' worth of data, which is stored in the first SRAM 101, in units of o rows×p columns' ($2 \leq o < m$, $2 \leq p \leq n$) of pixels' worth of data. The second rearrangement control circuit 102 outputs o rows×M columns of pixels' worth of data, stored in the second SRAM 103, one row at a time.

The DRAM 206 (second memory) has a burst mode as one of its operating modes. The burst mode is a mode in which a plurality of consecutive addresses are accessed (data is written or read out) in response to a single command. In the burst mode, the amount of data written or read out in response to a single command is the "burst length", and a plurality of burst lengths can be set in the DRAM 206.

In the present embodiment, the transfer control circuit 205 controls the data transfer so that the amount of data transferred to the DRAM 206 with a single access is no greater than the burst length set from the control unit 208. Furthermore, in the present embodiment, it is assumed that a data amount equivalent to 1000 pixels (determined according to the resolution (bit number) of the A/D conversion circuit) is set as the burst length by the control unit 208.

The transfer control circuit 205 accesses the DRAM 206 (writes and reads out data) so that the burst length becomes no greater than a data amount equivalent to 1000 pixels.

However, shorter burst lengths lead to less efficient DRAM access, and it is therefore desirable that the DRAM be accessed at a burst length close to the data amount equivalent to 1000 pixels. As such, the first rearrangement control circuit 100 sets the product of o and p in the o rows and p columns to be no greater than the burst length. Because the burst length is 1000 pixels, the first rearrangement control circuit 100 sets o to 4 and p to 250, which is equal to n, for example. Thus in the present embodiment, the first rearrangement control circuit 100 outputs the 100 rows×250 columns of pixels' worth of data, which is stored in the first SRAM 101, to the transfer control circuit 205 in units of four rows×250 columns of pixels' worth of data.

112 schematically indicates the operations carried out by the first rearrangement control circuit 100. The 100 rows×250 columns of pixels' worth of data, which is stored in the first SRAM 101, is output in order from output data 1, in units of four rows×250 columns of pixels' worth of data.

Once output data 25 is output, the first rearrangement control circuit 100 outputs the 250 columns (from the 251st pixel to the 500th pixel)×100 rows of pixels' worth of data, which are input next, in units of 250 columns×four rows of pixels' worth of data. In the same manner, once the 4000 columns×100 rows of pixels' worth of data has been rearranged and output, the 4000 columns×100 rows' (from the 101st row to the 200th row) of pixels' worth of data, which are input next, are processed in the same manner. The data of the 4000 columns×2000 rows are rearranged in this manner.

The first rearrangement control circuit 100 outputs data in units of 1000 pixels, which is the same as the burst length, and thus the transfer control circuit 205 can write data to the DRAM 206 efficiently. 113 schematically illustrates the sequence of the data output from the transfer control circuit 205, which is the same as the sequence of the data output from the first rearrangement control circuit 100, indicated by 112.

The transfer control circuit 205 writes the data into the DRAM 206 in units of 1000 pixels' worth of data, which is equal to the burst length, in order from output data 1, which makes it possible to write the data into the DRAM 206 efficiently. 114 indicates the sequence of the data written into consecutive addresses of the DRAM 206 using the pixel sequence of the image sensor 202, and is the same as the sequence of the data output by the transfer control circuit 205, indicated by 113.

115 schematically indicates the sequence of data read out by the transfer control circuit 205 from the DRAM 206. The transfer control circuit 205 reads out the data from the DRAM 206 in units of o rows×p columns (four rows×250 columns) of pixels, in the pixel sequence of the image sensor 202, in order from input data 1. Here, the transfer control circuit 205 reads out the data in units of o rows×p columns to take on the sequences of o rows×N columns (four rows×4000 columns) of pixels in the image sensor 202. As when writing the data, reading out the data in units of 1000 pixels, which is equal to the burst length, makes it possible to read out the data from the DRAM 206 efficiently.

The transfer control circuit 205 reads out the data sequentially from the DRAM 206, and once 4000 pixels×100 rows' worth of data has been read out, the next 4000 pixels×100 rows' (the 101st row to the 200th row) worth of data is read out. In the same manner, the transfer control circuit 205 reads out 4000 pixels×2000 rows' worth of data.

116 indicates the sequence of the data input to the second SRAM 103 of the second rearrangement control circuit 102 from the transfer control circuit 205. The sequence of the data input to the second rearrangement control circuit 102 is the same as the sequence of the data read out from the DRAM 206 by the transfer control circuit 205.

117 indicates the sequence of the data output from the second rearrangement control circuit 102. Using the second SRAM 103, which has a capacity capable of storing 4000 pixels×four rows' worth of data, the second rearrangement control circuit 102 rearranges the data, which has been input in units of 4000 pixels×four rows, in units of 4000 pixels× one row. In other words, by outputting the data from the second SRAM 103 one row at a time, the second rearrangement control circuit 102 outputs the data in the sequence of one row and N columns of pixels in the image sensor 202.

118 indicates the sequence of the data output from the rearranging circuit 204, which is the same as the sequence of the data output from the second rearrangement control circuit 102. As indicated in FIG. 1, the data read out concurrently from a plurality of rows of the image sensor 202 can be rearranged into the same order as if the data had been read out one row at a time, by using the first SRAM 101, the DRAM 206, and the second SRAM 103.

SRAM having a capacity capable of storing 4000 pixels× 100 rows', or 400,000 pixels', worth of data would be necessary to realize the same rearranging using only SRAM. However, with the configuration of the present embodiment, the capacity of the first SRAM 101 need only be enough to store 250 pixels×100 rows', or 25,000 pixels', worth of data, and the capacity of the second SRAM 103 need only be enough to store 4000 pixels×four rows', or 16,000 pixels', worth of data. This is equivalent to a storage capacity of 41,000 pixels.

If the same rearranging is to be realized using only DRAM, the DRAM's write and read addresses are not consecutive, and thus only an extremely small amount of data, compared to the burst length, can be read and written with a single access. This greatly reduces the data writing and readout efficiency. However, with the configuration of the present embodiment, the writing and readout of data to and from the DRAM is carried out by an amount of data equivalent to the DRAM burst length, which provides good data writing and readout efficiency.

Figure 3A:
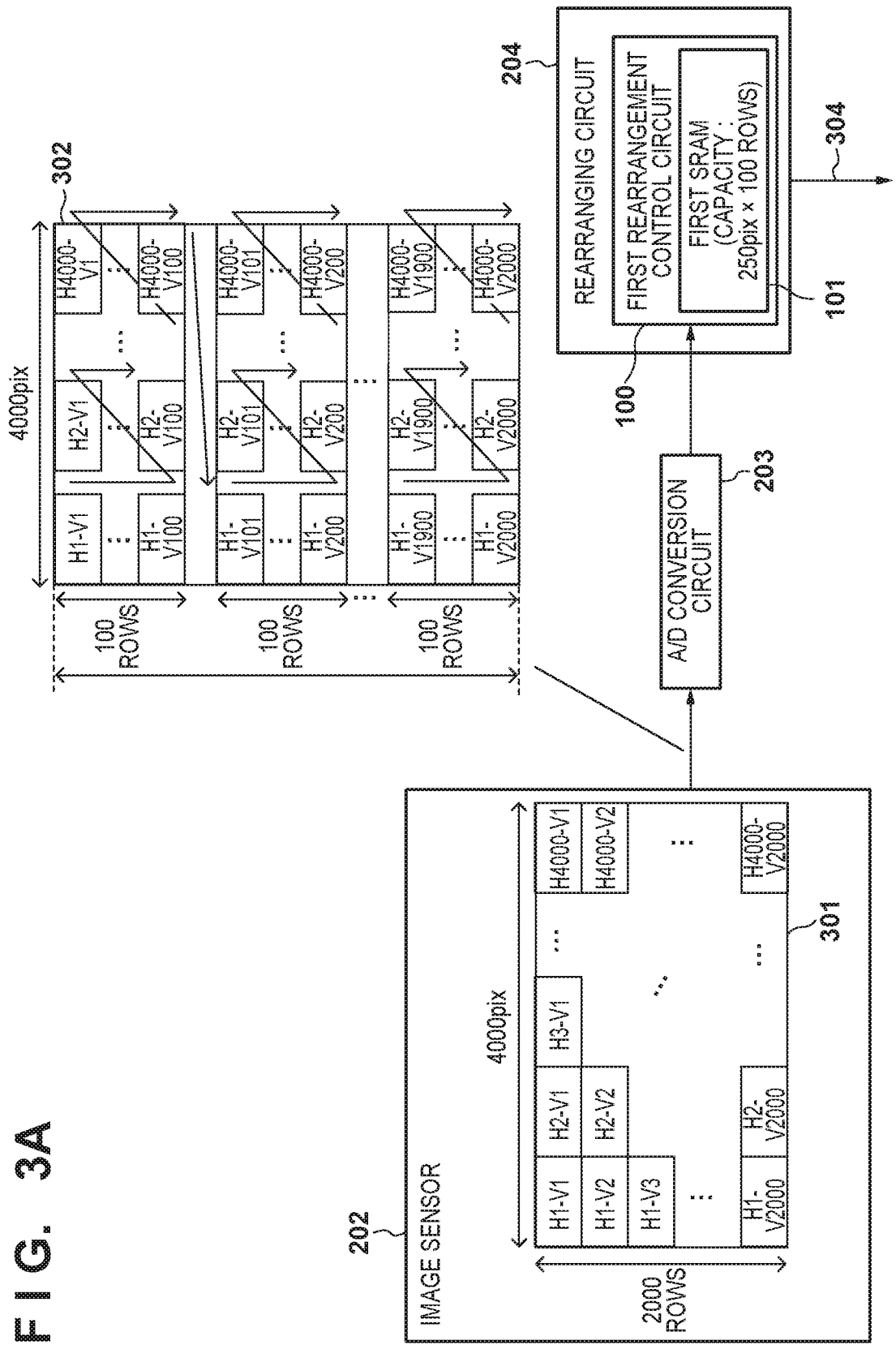

The data rearrangement operations carried out by the first rearrangement control circuit 100 will be described using FIGS. 3A to 3C. 301 indicates the sequence of pixels (data) in the image sensor 202. 4000 horizontally-arranged pixels (columns)×2000 vertically-arranged pixels (rows) are arranged in a matrix. 302 indicates the sequence of the data read out from the image sensor 202. Here, it is assumed that 100 rows are read out concurrently. Accordingly, 100 pixels' worth of data is input in parallel from the image sensor to the A/D conversion circuit 203.

303 indicates the sequence of data input to the first SRAM 101, which is the same as the sequence of the data read out from the image sensor 202. The first SRAM 101 has a capacity capable of storing 250 horizontally-arranged pixels (columns)×100 vertically-arranged pixels' (rows) worth of data. The first rearrangement control circuit 100 outputs the 100 rows×250 columns of pixels' worth of data, stored in the first SRAM 101, four rows at a time, in units of 250 horizontally-arranged pixels, in the order of the vertical direction sequence (i.e., in units of four row×250 column pixel blocks). As a result, the data is written into the DRAM 206 in a sequence different from the sequence of the readout from the image sensor 202. In this manner, the first rearrangement control circuit 100 rearranges the data using the first SRAM 101.

304 indicates the sequence of the data output from the first SRAM 101. The first rearrangement control circuit 100 outputs the data sequentially from the first SRAM 101, in units of four rows×250 columns of pixels. As indicated by the arrows in FIGS. 3A to 3C, first, the data from the first to fourth rows (H1-V1 to H250-V4) is output in the order of H1-V1, H1-V2, H1-V3, H1-V4, H2-V1, and so on. In other words, four pixels in the vertical direction are output, and then the output shifts by one pixel in the horizontal direction. The first rearrangement control circuit 100 then outputs the data from the fifth to eighth rows in the same manner. Once the data from the 97th to 100th rows has been output, the first rearrangement control circuit 100 outputs the data four rows at a time in the same manner, for the next 250 pixels (the 251st to 500th pixels) in the horizontal direction. Then, once the 97th to 100th rows of data, i.e., the 3751st to 4000th pixels, have been output, the first rearrangement control circuit 100 outputs the data of the first to 250th pixels in the 101st to 104th rows. The first rearrangement control circuit 100 outputs the 4000 horizontally-arranged pixels (columns)×2000 vertically-arranged pixels' (rows) worth of data, read out from the image sensor 202, in such a sequence.

The data rearrangement operations carried out by the transfer control circuit 205 and the second rearrangement control circuit 102 will be described next using FIGS. 4A to 4E. 401 in FIG. 4C indicates the sequence of data written into the DRAM 206 by the transfer control circuit 205. As described above, the transfer control circuit 205 writes the data output from the first rearrangement control circuit 100 into the DRAM 206 in the same sequence. Accordingly, the data sequence indicated by 401 is equivalent to the data sequence indicated by 304 in FIGS. 3A and 3C.

402 indicates the sequence of data read out from the DRAM 206 by the transfer control circuit 205. The transfer control circuit 205 reads out the data from the DRAM 206 in units of four rows×250 columns. However, unlike when writing data, 4000 pixels' worth of data in the horizontal direction is read out first, and then the next four rows of data is read out.

In other words, the transfer control circuit 205 first reads out the data of H1-V1 to H250-V4 from the DRAM 206. Here, the data written into the next consecutive address region of the DRAM 206 is the data of H1-V5 to H250-V8. However, the next data read out by the transfer control circuit 205 is the data of the 251st to 500th pixels in the same rows (V1 to V4) (i.e., H251-V1 to H500-V4). As such, the transfer control circuit 205 reads out the data after jumping the readout address.

In the present embodiment, the control unit 208 sets offset data transfer amounts 1 to 3, and offsets 1 to 3, in the transfer control circuit 205, in order to control the address when the transfer control circuit 205 reads out the data from the DRAM 206. Then, once data corresponding to an amount set as an offset data transfer amount x (x=1, 2, 3) has been read out, the transfer control circuit 205 executes the readout after jumping the readout address by the offset x.

Figure 4A:
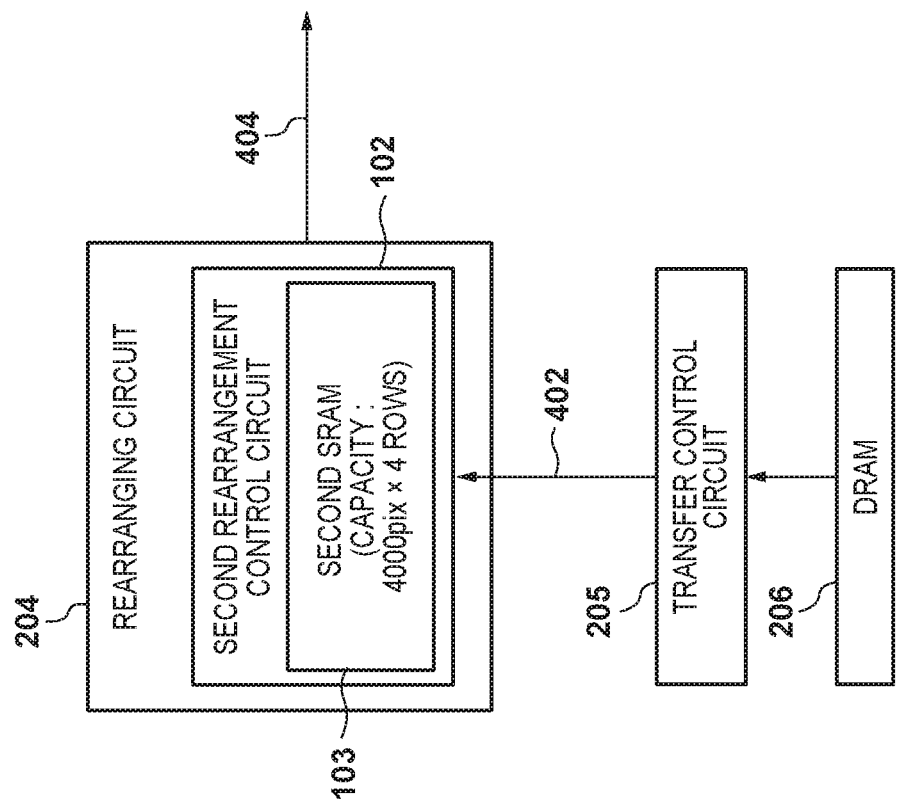

The following are set in the present embodiment.
offset data transfer amount 1: a data amount equivalent to four rows×250 columns of pixels
offset data transfer amount 2: a data amount equivalent to four rows×4000 columns of pixels
offset data transfer amount 3: a data amount equivalent to 100 rows×4000 columns of pixels The corresponding offsets 1 to 3 correspond to address jump amounts for reading out a data amount equivalent to four rows×250 columns of pixels in the order indicated by the arrow in 402 of FIGS. 4A and 4E.

Accordingly, upon reading out a data amount equivalent to four rows×250 columns of pixels, which corresponds to the offset data transfer amount 1, the transfer control circuit 205 then jumps the DRAM address for the next readout by the offset 1. In the same manner thereafter, each time four rows×250 columns of pixels' worth of data is read out, the readout address is jumped by the offset 1, and four rows×250 columns of pixels' worth of data is read out.

Thus when 4000 horizontally-arranged×four vertically-arranged pixels' worth of data, corresponding to the offset data transfer amount 2, is read out, the transfer control circuit 205 jumps the DRAM address for the next readout by the offset 2. Then, the transfer control circuit 205 reads out the next four rows' worth of data using the offset data transfer amount 1 and the offset 1. In the same manner thereafter, the readout address is jumped by the offset 2 each time 4000 horizontally-arranged×four vertically-arranged pixels' worth of data is read out, and the data is read out using the offset data transfer amount 1 and the offset 1.

The readout is repeated using the offset data transfer amounts 1 and 2 and the offsets 1 and 2, and once an amount of data equivalent to 4000 pixels×100 rows, which corresponds to the offset data transfer amount 3, has been read out, the transfer control circuit 205 jumps the DRAM address for the next readout by the offset 3. Then, the transfer control circuit 205 reads out the next 100 rows' worth of data using the offset data transfer amounts 1 and 2 and the offsets 1 and 2. In the same manner thereafter, the readout address is jumped by the offset 3 each time 4000 horizontally-arranged×100 vertically-arranged pixels' worth of data is read out, and the data is read out using the offset data transfer amounts 1 and 2 and the offsets 1 and 2.

In this manner, the transfer control circuit 205 reads out 4000 horizontally-arranged×2000 vertically-arranged pixels' worth of data by repeating the data readout using the offset data transfer amounts 1 to 3 and the offsets 1 to 3.

Note that the data read out by the transfer control circuit 205 is written into the second SRAM 103 in sequence. As described above, the second SRAM 103 has a capacity capable of storing four rows×4000 columns of pixels' worth of data. The transfer control circuit 205 writes the data into the second SRAM 103 using the sequence of four rows×4000 columns as indicated by 403 in FIG. 4B by performing the readout using the offset data transfer amount 1 and the offset 1.

Accordingly, as indicated by 404, outputting the data from the second SRAM 103 in units of one row (4000 horizontally-arranged pixels×1 vertically-arranged pixel) makes it possible to output the data in the same sequence as if the data had been read out one row at a time from the image sensor 202.

Figure 5:
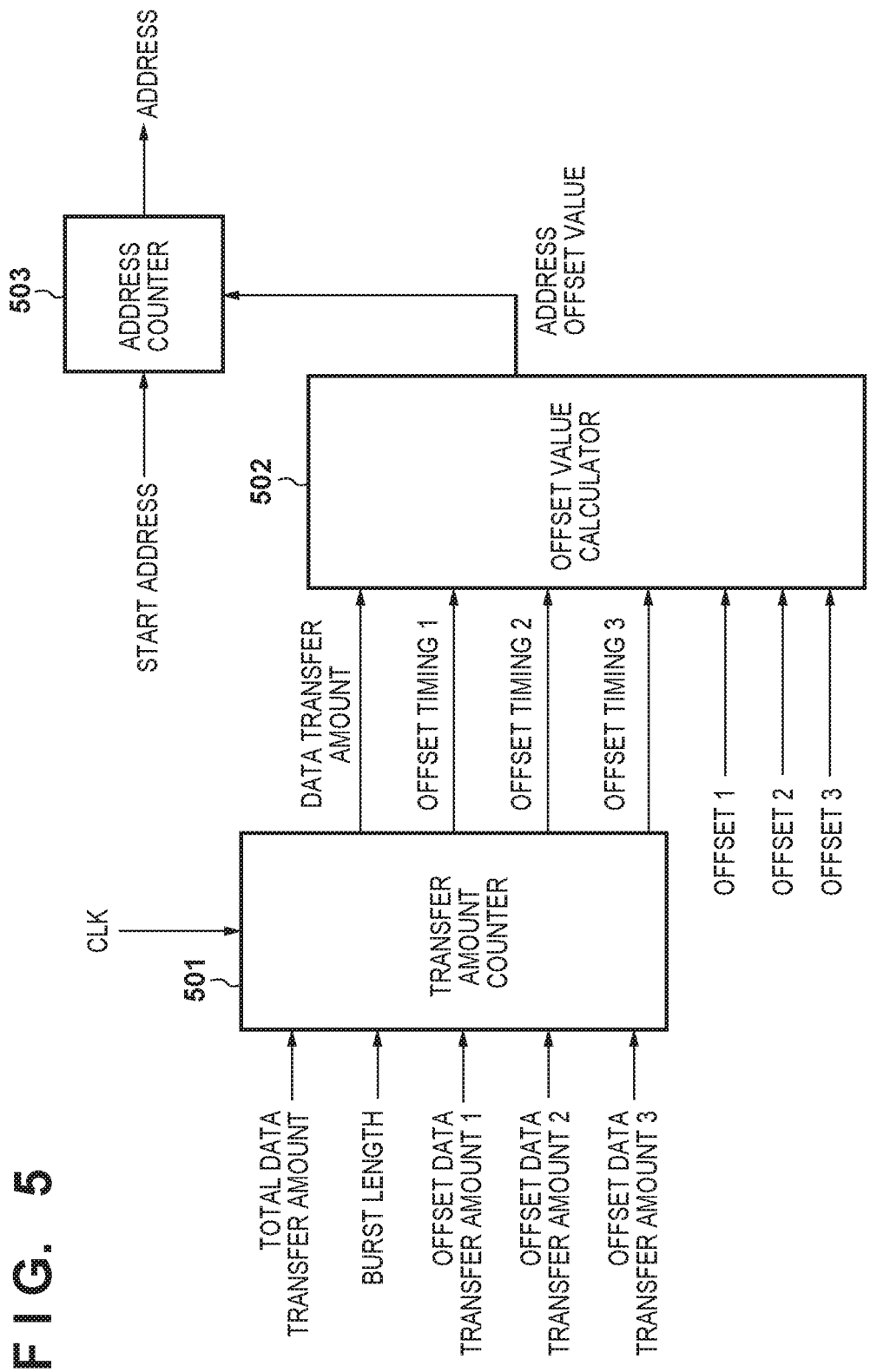
FIG. 5 is a diagram illustrating a readout address generation method according to the first embodiment.

Address generation operations by the transfer control circuit 205, which realize the readout using the above-described offset data transfer amounts 1 to 3 and offsets 1 to 3, will be described next. FIG. 5 is a block diagram illustrating an example of the functional configuration of an address generation unit in the transfer control circuit 205.

The address generation unit includes a transfer amount counter 501, an offset value calculator 502, and an address counter 503. All of these hold parameters that can be set by the control unit 208. Specifically, the parameters that can be set in the transfer amount counter 501 are a total data transfer amount, a burst length, and offset data transfer amounts 1 to 3. The parameters that can be set in the offset value calculator 502 are the offsets 1 to 3. The parameter that can be set in the address counter 503 is a start address. These parameters are set by the control unit 208 before starting to read data out from the image sensor 202.

Upon the control unit 208 making an instruction for data to be read out from the DRAM 206, the transfer control circuit 205 starts the above-described readout operations. The transfer amount counter 501 counts the amount of data read out from the DRAM 206. For example, a clock CLK is supplied to the transfer amount counter 501 each time there is a readout, and the transfer amount counter 501 counts the clock number×the burst length as the amount of data read out from the DRAM 206 (the data transfer amount).

An amount of data equivalent to the burst length is read out from the DRAM 206 each time there is a readout, and thus the address given to the DRAM 206 increases by a unit based on the burst length. Here, it is assumed that the burst length set by the control unit 208 is equal to the unit by which the address increases. Accordingly, the transfer amount counteroutputs the burst length to the offset value calculator 502 as the data transfer amount.

Once the data transfer amount being counted reaches the offset data transfer amount 1, the transfer amount counter 501 notifies the offset value calculator 502 of an offset timing 1. Likewise, once the data transfer amount being counted reaches the offset data transfer amount 2 and the offset data transfer amount 3, the transfer amount counter 501 notifies the offset value calculator 502 of an offset timing 2 and an offset timing 3, respectively. The transfer amount counter 501 notifies the control unit 208 that the data transfer is complete upon the data transfer amount being counted reaching the total data transfer amount.

If the data transfer amount has been received without the notifications of the offset timings 1 to 3 from the transfer amount counter 501, the offset value calculator 502 outputs the data transfer amount received from the transfer amount counter 501 to the address counter 503 as an address offset value that is to be added to a start address.

On the other hand, if the data transfer amount has been received in accordance with the notifications of any of the offset timings 1 to 3 from the transfer amount counter 501, the offset value calculator 502 outputs a value obtained by adding the offset corresponding to the notified timing to the data transfer amount as the address offset value.

The address counter 503 cumulatively adds the address offset values input from the offset value calculator 502 to the start address has been set, and outputs the resulted address as the readout address.

Figure 8:
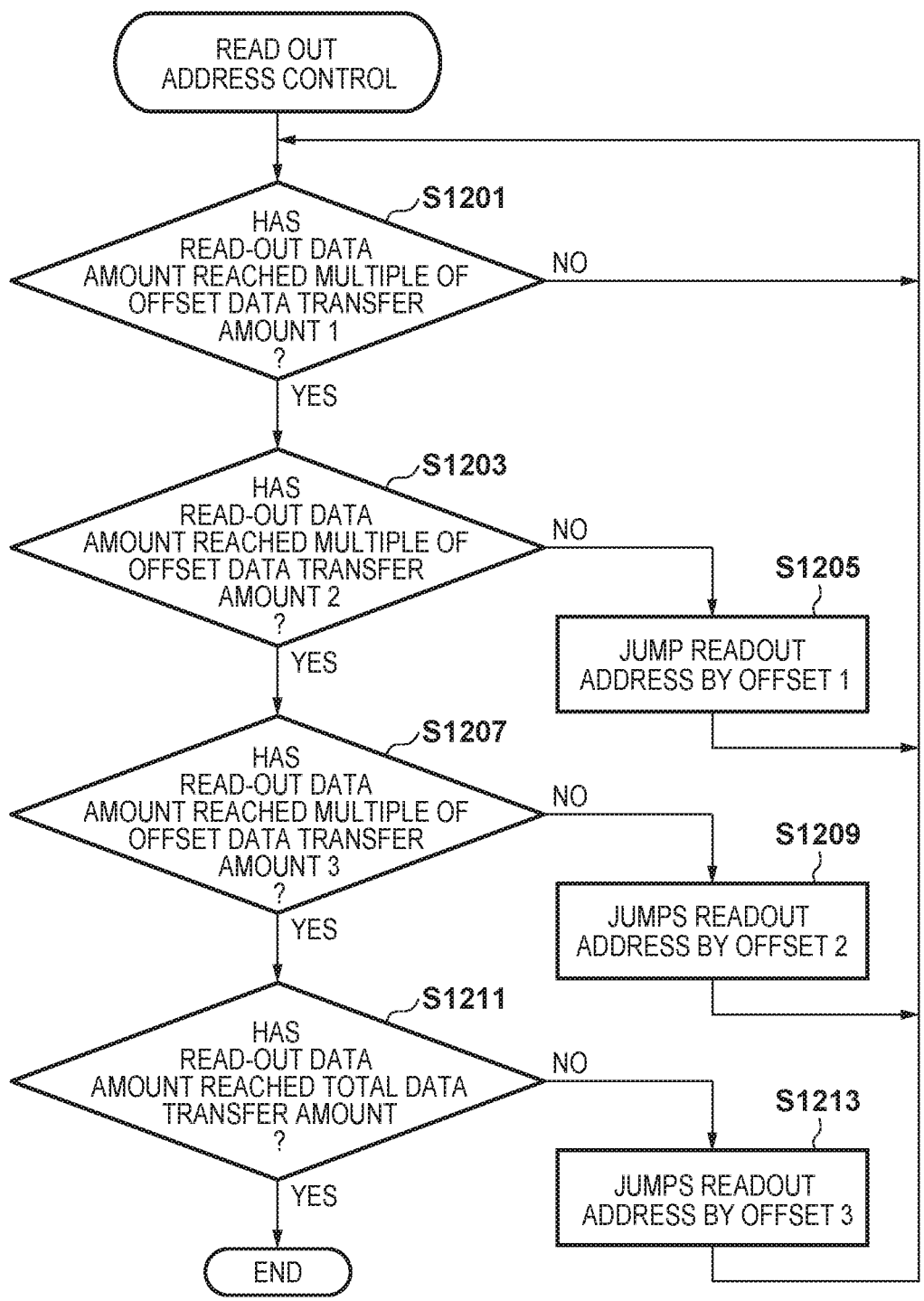
FIG. 8 is a flowchart pertaining to readout address generation operations according to the first embodiment.

FIG. 8 is a flowchart illustrating such a method for generating a readout address. In step S1201, the transfer control circuit 205 determines whether or not the read-out data amount has reached a multiple of the offset data transfer amount 1. If yes, the process moves to step S1203, and if no, the process of step S1201 is repeated.

In step S1203, the transfer control circuit 205 determines whether or not the read-out data amount has reached a multiple of the offset data transfer amount 2. If yes, the process moves to step S1207, and if no, the process moves to step S1205.

In step S1205, the transfer control circuit 205 jumps (increases) the readout address by the offset 1, and the process then returns to step S1201.

In step S1207, the transfer control circuit 205 determines whether or not the read-out data amount has reached a multiple of the offset data transfer amount 3. If yes, the process moves to step S1211, and if no, the process moves to step S1209.

In step S1209, the transfer control circuit 205 jumps (increases) the readout address by the offset 2, and the process then returns to step S1201.

In step S1211, the transfer control circuit 205 determines whether or not the read-out data amount has reached the total data transfer amount. If yes, the process ends, and if no, the process moves to step S1213.

In step S1213, the transfer control circuit 205 jumps (increases) the readout address by the offset 3, and the process then returns to step S1201.

Figure 6:
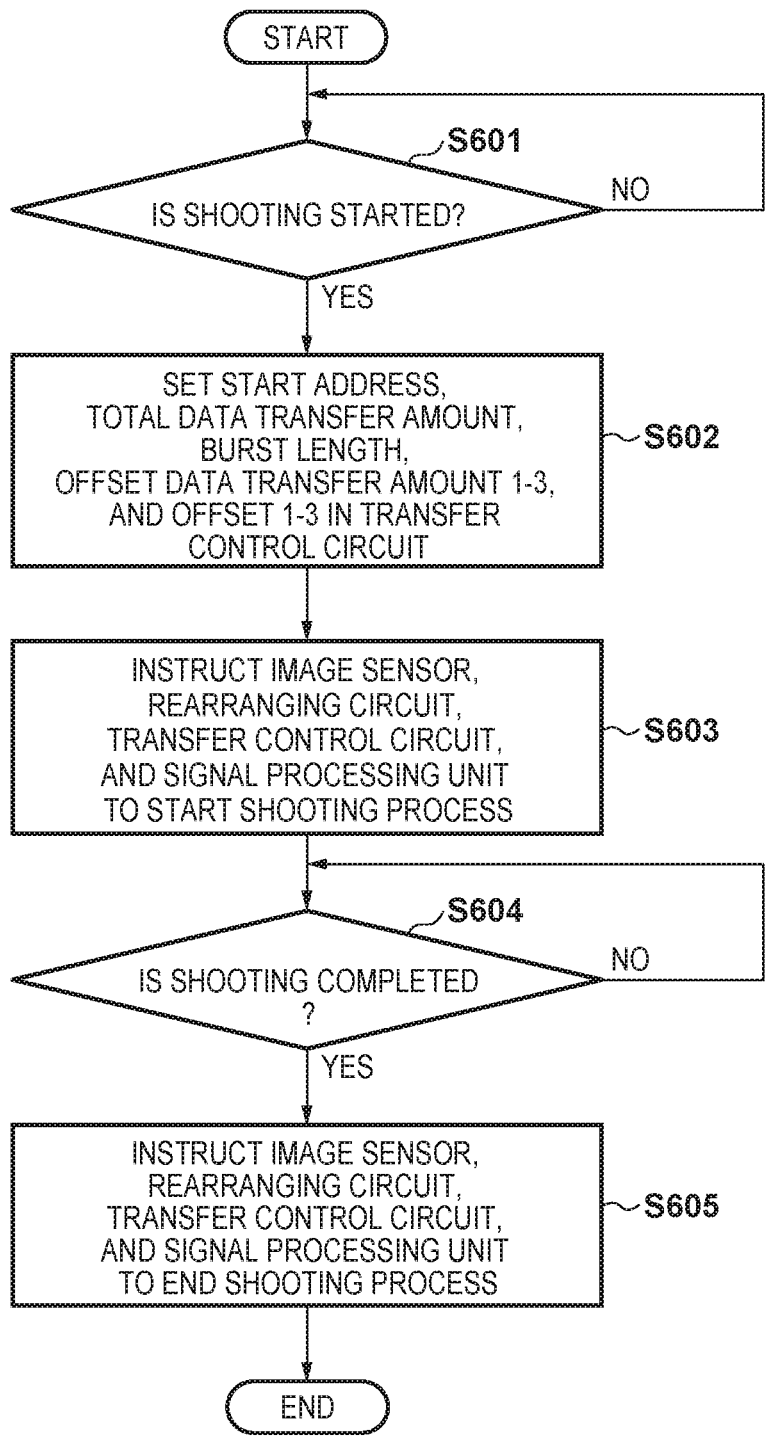
FIG. 6 is a flowchart pertaining to image capturing operations according to the first embodiment.

FIG. 6 is a flowchart pertaining to operations carried out when the digital camera 200 takes a shot, according to the present embodiment.

In step S601, the control unit 208 determines whether or not a shooting start instruction has been received from the user through, for example, the operation unit 213. The shooting start instruction may be an operation of fully depressing a shutter button, for example. If it is determined that the shooting start instruction has been received, the control unit 208 moves the process to step S602, whereas if it is not determined that the shooting start instruction has been received, the control unit 208 repeats the process of step S601. Note that while standing by to receive the shooting start instruction, the control unit 208 executes control for causing the display unit 209 to function as an EVF, for example.

In step S602, the control unit 208 sets the DRAM start address, the total data transfer amount, the burst length, the offset data transfer amount 1 to 3, and the offsets 1 to 3 in the transfer control circuit 205. These values can be stored in the ROM 211 in advance, for example.

In step S603, the control unit 208 instructs the image sensor 202, the rearranging circuit 204, the transfer control circuit 205, and the signal processing circuit 207 to start the shooting process. As a result, exposure operations of the image sensor 202 are carried out, and data is read out from a plurality of rows in the image sensor 202 concurrently. The above-described rearranging processing is then carried out by the rearranging circuit 204 and the transfer control circuit 205, and the data is output to the signal processing circuit 207 in the same sequence as if one row at a time is read out from the image sensor 202. The signal processing circuit 207 applies predetermined image processing to the image data to generate an image data file for recording and image data for display. The control unit 208 records the image data file through the recording unit 210 and displays the image data for display in the display unit 209.

In step S604, the control unit 208 determines whether or not the shooting process is complete. If yes, the process moves to step S605, and if no, the control unit 208 stands by for the shooting process to be complete.

In step S605, the control unit 208 instructs the image sensor 202, the rearranging circuit 204, the transfer control circuit 205, and the signal processing circuit 207 to end the shooting process, and the process ends.

Figure 9:
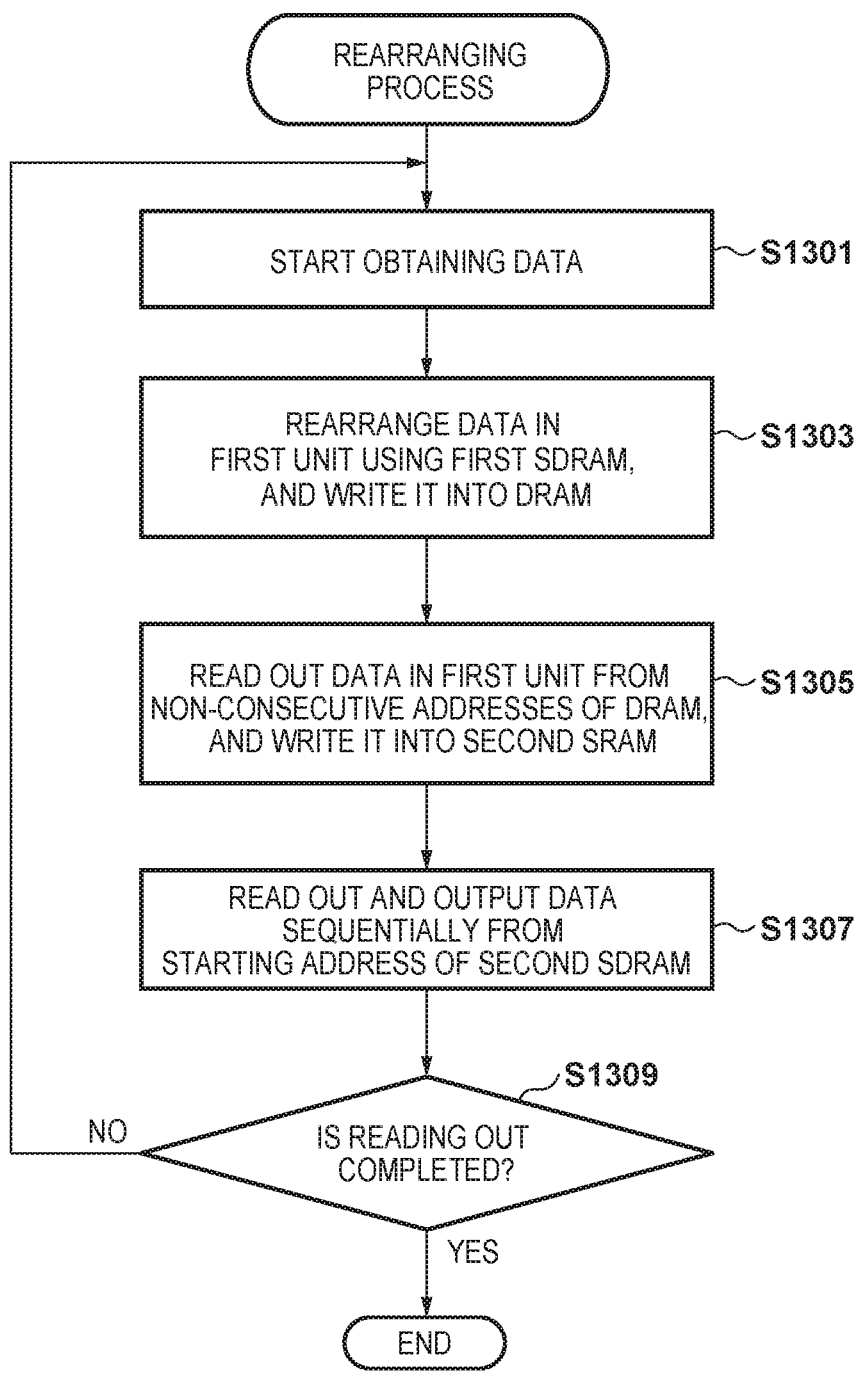
FIG. 9 is a flowchart pertaining to data rearrangement operations according to the first embodiment.

FIG. 9 is a flowchart illustrating the rearranging process implemented by the rearranging circuit 204, the transfer control circuit 205, and the DRAM 206 in step S603.

In step S1301, the rearranging circuit 204 reads out a plurality of rows from the image sensor 202 concurrently, and starts obtaining the data output by the A/D conversion circuit 203.

Figure 3B:
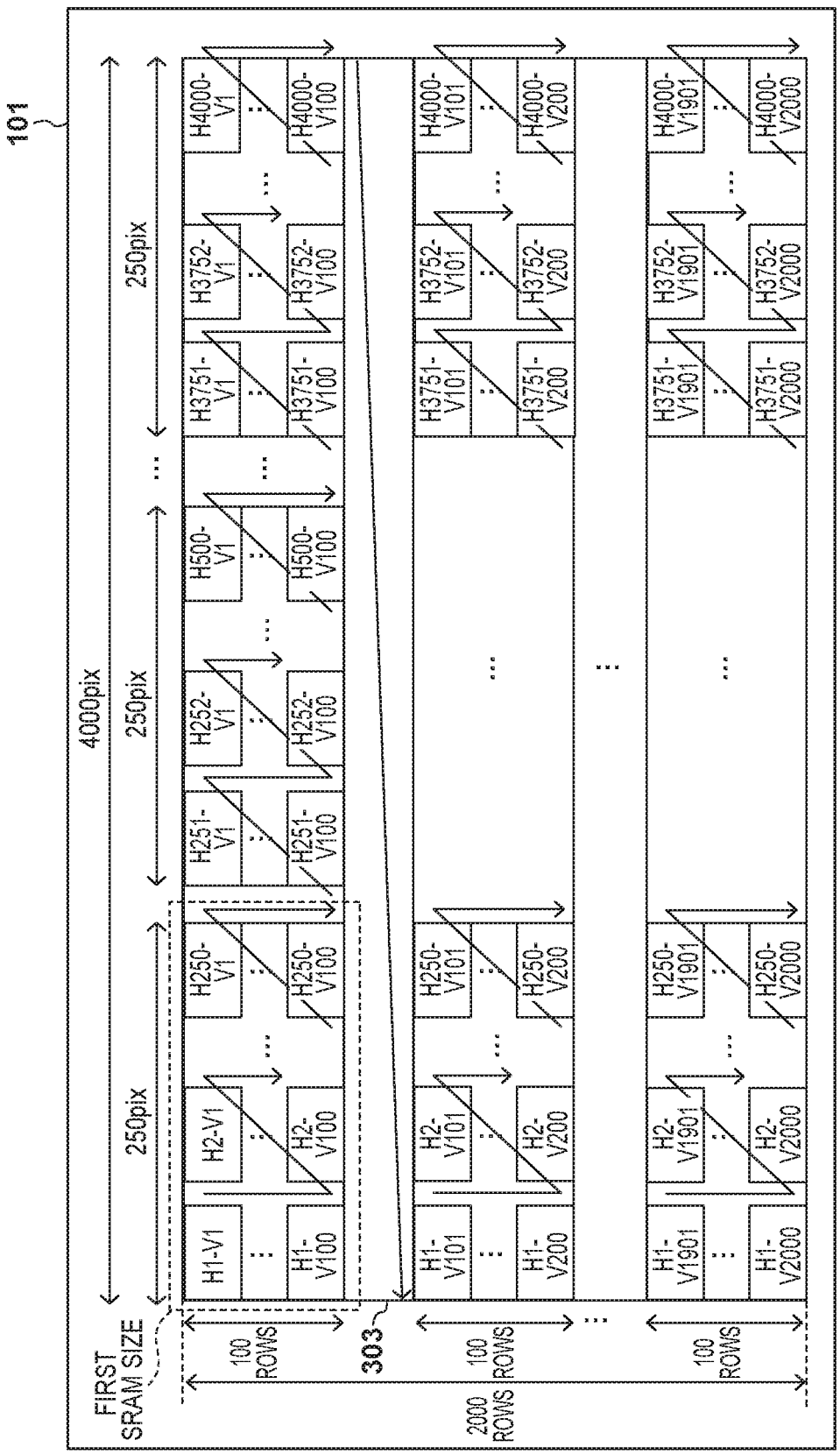

In step S1303, the first rearrangement control circuit 100 of the rearranging circuit 204 records the obtained data into the first SRAM 101 according to the sequence indicated by 303 in FIG. 3B. The transfer control circuit 205 then writes the data from the first SRAM 101 into the DRAM 206 in amounts corresponding to a first unit (here, four rows×250 pixels), according to the sequence indicated by 304 in FIG. 3C. This rearranges the data by amounts equivalent to the first unit.

In step S1305, the transfer control circuit 205 carries out the address control described with reference to FIGS. 5 and 8, and reads out the data in non-consecutive addresses from the DRAM 206 in amounts corresponding to the first unit. The data is therefore read out according to the sequence indicated by 402 in FIG. 4E and rearranged. The transfer control circuit 205 sequentially writes the read-out data into the second SRAM 103 provided in the second rearrangement control circuit 102 of the rearranging circuit 204. The data is therefore written into the second SRAM 103 according to the sequence indicated by 404 in FIGS. 4A and 4D.

In step S1307, the second rearrangement control circuit 102 reads out and outputs the data sequentially from the starting address in the second SRAM 103. Data having the same sequence as the sequence if the data had been read out from the image sensor 202 one row at a time is output from the rearranging circuit 204 as a result.

In step S1309, the rearranging circuit 204 determines whether or not the output is complete for all the data read out from the image sensor 202. If yes, the process ends, and if no, the processing from steps S1301 to S1307 is repeated.

Variation

Thus far, an example in which 100 vertically-arranged pixels (rows) are read out concurrently from a range of 4000 horizontally-arranged pixels (columns)×2000 vertical pixels (rows) the image sensor 202, and the data is written into and read out from the DRAM 206 in blocks of 250 columns×four rows of pixels, has been described. However, the readout range, the number of rows read out concurrently, and the unit by which data is written to and read out from the DRAM 206 may be set to other values.

Additionally, the first SRAM 101 and the second SRAM 103 may be different memory spaces in the same memory. Furthermore, the control unit 208 may change the range of readout from the image sensor 202, the number of rows read out concurrently, and the size of the memory spaces assigned to the first SRAM 101 and the second SRAM 103 depending on a shooting mode set by the user, such as still images, moving images, live view, or the like. At this time, the control unit 208 may change the unit of the number of rows rearranged by the first SRAM 101 so that the first SRAM 101 and the second SRAM 103 have the minimum necessary memory size. FIGS. 7A to 7C illustrate an example of changing the sizes assigned to the first SRAM 101 and the second SRAM 103 in accordance with the number of horizontally-arranged pixels in the range of readout from the image sensor 202 and the number of rows read out concurrently, so that the memory size is the minimum necessary size.

FIG. 7A is a diagram illustrating the memory size necessary when concurrently reading out 100 rows from a range of 4000 horizontally-arranged pixels (columns), described earlier. If, for example, the data is rearranged into the same sequence as if one row at a time had been read out using only SRAM, the necessary SRAM size (storage capacity) would be for storing data of 4000 pixels×100 rows, for a total of 400000 pixels. However, the SRAM size necessary when rearranging the data in units of four rows using the first SRAM 101 is for storing data of 250 pixels×100 rows, for a total of 25000 pixels, for the first SRAM 101, and 4000 pixels×four rows, for a total of 16000 pixels, for the second SRAM 103. This gives a total of 41000 pixels. As described above, the rearranging in the first SRAM 101 uses a unit of 250 horizontal pixels in order to ensure the data amount is the same as the burst length of the DRAM 206.

The SRAM size necessary when rearranging the data in units of eight rows using the first SRAM 101 is for storing data of 125 pixels×100 rows, for a total of 12500 pixels, for the first SRAM 101, and 4000 pixels×eight rows, for a total of 32000 pixels, for the second SRAM 103. This gives a total of 44500 pixels. Here, too, the rearranging in the first SRAM 101 uses a unit of 125 horizontal pixels in order to ensure the data amount is the same as the burst length of the DRAM 206.

The SRAM size necessary when rearranging the data in units of two rows using the first SRAM 101 is for storing data of 500 pixels×100 rows, for a total of 50000 pixels, for the first SRAM 101, and 4000 pixels×two rows, for a total of 8000 pixels, for the second SRAM 103. This gives a total of 58000 pixels. Here, too, the rearranging in the first SRAM 101 uses a unit of 500 horizontal pixels in order to ensure the data amount is the same as the burst length of the DRAM 206.

In this manner, in the first SRAM 101, when 100 rows are read out concurrently from a range of 4000 horizontal pixels, rearranging the data in units of four rows can ensure a smaller overall necessary SRAM size than when rearranging the data in units of eight or two rows. Accordingly, when a shooting mode in which 100 rows are read out concurrently from a range in the image sensor 202 having a horizontal size of 4000 pixels, the control unit 208 may assign sizes to the first SRAM 101 and the second SRAM 103 that the data is rearranged in units of four rows in the first SRAM 101.

FIG. 7B is a diagram illustrating the memory size necessary when concurrently reading out 100 rows from a range of 16000 horizontal pixels. If, for example, the data is rearranged into the same sequence as if one row at a time had been read out using only SRAM, the necessary SRAM size (storage capacity) would be for storing data of 16000 pixels×100 rows, for a total of 1600000 pixels. However, the SRAM size necessary when rearranging the data in units of four rows using the first SRAM 101 is for storing data of 250 pixels×100 rows, for a total of 25000 pixels, for the first SRAM 101, and 16000 pixels×four rows, for a total of 64000 pixels, for the second SRAM 103. This gives a total of 89000 pixels. The rearranging in the first SRAM 101 uses a unit of 250 horizontal pixels in order to ensure the data amount is the same as the burst length of the DRAM 206.

The SRAM size necessary when rearranging the data in units of eight rows using the first SRAM 101 is for storing data of 125 pixels×100 rows, for a total of 12500 pixels, for the first SRAM 101, and 16000 pixels×eight rows, for a total of 128000 pixels, for the second SRAM 103. This gives a total of 140500 pixels. The rearranging in the first SRAM 101 uses a unit of 125 horizontal pixels in order to ensure the data amount is the same as the burst length of the DRAM 206.

The SRAM size necessary when rearranging the data in units of two rows using the first SRAM 101 is for storing data of 500 pixels×100 rows, for a total of 50000 pixels, for the first SRAM 101, and 16000 pixels×two rows, for a total of 32000 pixels, for the second SRAM 103. This gives a total of 82000 pixels. Here, too, the rearranging in the first SRAM 101 uses a unit of 500 horizontal pixels in order to ensure the data amount is the same as the burst length of the DRAM 206.

In this manner, in the first SRAM 101, when 100 rows are read out concurrently from a range of 16000 horizontal pixels, rearranging the data in units of two rows can ensure a smaller overall necessary SRAM size than when rearranging the data in units of four or eight rows. Accordingly, when a shooting mode in which 100 rows are read out concurrently from a range in the image sensor 202 having a horizontal size of 16000 pixels, the control unit 208 may assign sizes to the first SRAM 101 and the second SRAM 103 that the data is rearranged in units of two rows in the first SRAM 101.

FIG. 7C is a diagram illustrating the memory size necessary when concurrently reading out 200 rows from a range of 4000 horizontally-arranged pixels. If, for example, the data is rearranged into the same sequence as if one row at a time had been read out using only SRAM, the necessary SRAM size (storage capacity) would be for storing data of 4000 pixels×200 rows, for a total of 800000 pixels. However, the SRAM size necessary when rearranging the data in units of four rows using the first SRAM 101 is for storing data of 250 pixels 200 rows, for a total of 50000 pixels, for the first SRAM 101, and 4000 pixels×four rows, for a total of 16000 pixels, for the second SRAM 103. This gives a total of 66000 pixels. The rearranging in the first SRAM 101 uses a unit of 250 horizontal pixels in order to ensure the data amount is the same as the burst length of the DRAM 206.

The SRAM size necessary when rearranging the data in units of eight rows using the first SRAM 101 is for storing data of 125 pixels×200 rows, for a total of 25000 pixels, for the first SRAM 101, and 4000 pixels×eight rows, for a total of 32000 pixels, for the second SRAM 103. This gives a total of 57000 pixels. The rearranging in the first SRAM 101 uses a unit of 125 horizontal pixels in order to ensure the data amount is the same as the burst length of the DRAM 206.

The SRAM size necessary when rearranging the data in units of two rows using the first SRAM 101 is for storing data of 500 pixels×200 rows, for a total of 100000 pixels, for the first SRAM 101, and 4000 pixels×two rows, for a total of 8000 pixels, for the second SRAM 103. This gives a total of 108000 pixels. Here, too, the rearranging in the first SRAM 101 uses a unit of 500 horizontal pixels in order to ensure the data amount is the same as the burst length of the DRAM 206.

In this manner, in the first SRAM 101, when 200 rows are read out concurrently from a range of 4000 horizontal pixels, rearranging the data in units of eight rows can ensure a smaller overall necessary SRAM size than when rearranging the data in units of two or four rows. Accordingly, when a shooting mode in which 200 rows are read out concurrently from a range in the image sensor 202 having a horizontal size of 4000 pixels, the control unit 208 may assign sizes to the first SRAM 101 and the second SRAM 103 that the data is rearranged in units of eight rows in the first SRAM 101.

The present embodiment describes the burst length of the DRAM 206 as being a data amount equivalent to 1000 pixels. This is merely one example, however, and another burst length may be used as long as it is not a burst length that will cause a drastic drop in the access efficiency of the DRAM 206.

Additionally, although the present embodiment describes a configuration in which the rearranging circuit 204 includes the first SRAM 101 and the second SRAM 103, the SRAMs may be included in another function block instead, such as the image sensor 202 or the transfer control circuit 205.

Additionally, the transfer control circuit 205 of the present embodiment is configured for DRAM access while controlling address jumps with a single address control unit, for a single write port and a single readout port. However, each of a plurality of ports may have address control units, and DRAM access may be carried out while controlling addresses individually. For example, if 100 rows of data read out concurrently are rearranged in units of four rows, the DRAM 206 may be accessed using 25 (100 rows/four rows) different address control units, write ports, and readout ports. The number of address control units need not be the same as the number of write ports and readout ports.

The present embodiment also describes the burst length set by the control unit 208 as being set with a value defined by the data bus width between the first SRAM 101/second SRAM 103 and the transfer control circuit 205. However, the burst length may be set with a value defined by a different bus width. For example, the burst length may be set with a value defined by the data bus width between the transfer control circuit 205 and the DRAM 206.

Finally, although the present embodiment describes the burst length set by the control unit 208 as being a value equivalent to the burst length of the data transferred by the transfer control circuit 205 with each access of the DRAM 206, another value may be used instead. For example, the burst length set by the control unit 208 may be a value equivalent to the maximum burst length at which the DRAM 206 can be accessed.

According to the present embodiment, using a combination of SRAM and DRAM makes it possible to rearrange data, which has been read out concurrently from a plurality of rows in an image sensor, according to the same sequence as if the data had been read out one row at a time, while suppressing an increase in the circuit scale and a drop in the readout rate.

Second Embodiment

A second embodiment of the present invention will be described next. The present embodiment pertains to operations, carried out using the configuration described in the first embodiment, in which the number of rows read out from the image sensor 202 concurrently is not divisible by the number of rows in the first unit of rearrangement in the first SRAM (i.e., when m is not a multiple of o).

As an example, a case where 98 rows at a time are read out concurrently from the image sensor 202, and the first SRAM rearranges the data in units of four rows in the same manner as in the first embodiment (i.e., m=98 and o=4) will be described.

Figure 10:
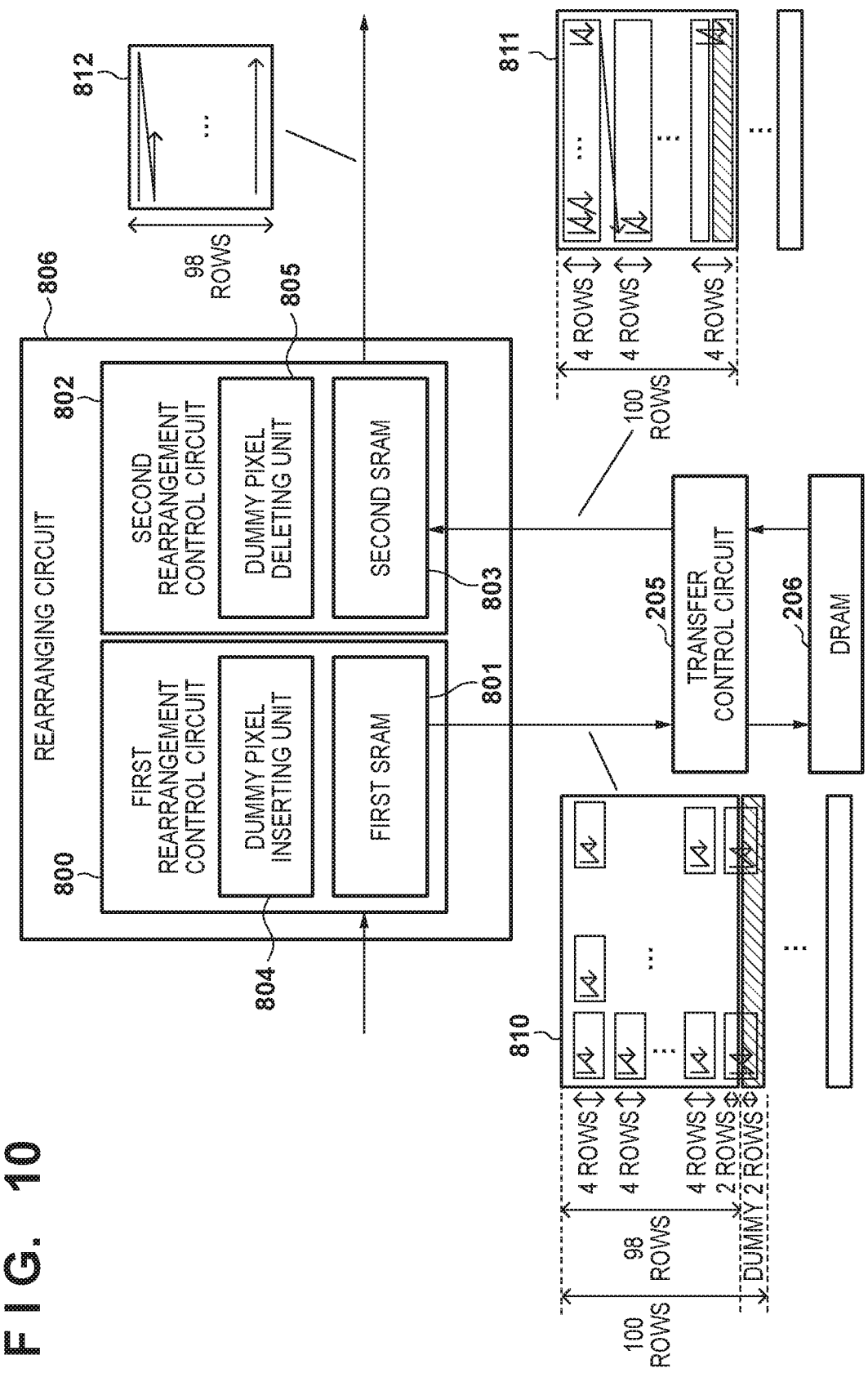
FIG. 10 is a diagram illustrating data rearrangement operations according to a second embodiment.

FIG. 10 is a diagram schematically illustrating the configuration according to the present embodiment, for rearranging 98 rows of data, which have been read out from the image sensor 202 concurrently, in the same order as if the data had been read out one row at a time. The configurations of the transfer control circuit 205 and the DRAM 206 are the same as in the first embodiment and will therefore not be described here.

A rearranging circuit 806 includes a first rearrangement control circuit 800, and rearranges 98 rows' worth of data, which has been read out concurrently from the image sensor 202 and A/D-converted, in units of four rows, and outputs the result to the transfer control circuit 205. 98 is not divisible by 4, and thus in the present embodiment, a dummy pixel inserting unit 804 in the first rearrangement control circuit 800 inserts rows constituted by dummy pixels (dummy rows) so that the number of rows written into first SRAM 801 becomes a number divisible by 4.

The number of dummy rows inserted can be found by m mod o (the remainder obtained when dividing m by o). Thus in the example described here, the dummy pixel inserting unit 804 inserts two dummy rows into the input data. As a result, the first rearrangement control circuit 800 writes 100 rows of data (98 rows+2 rows) into the first SRAM 801.

As in the first embodiment, the transfer control circuit 205 writes the data from the first SRAM 801 into the DRAM 206 in units of 250 horizontal pixels (columns)×four vertical pixels (rows). 810 indicates the sequence of the data written into the DRAM 206. The transfer control circuit 205 also rearranges the data by reading out the data from the DRAM 206 through the same type of address control as that described in the first embodiment. 811 indicates the sequence of the data read out from the DRAM 206. The transfer control circuit 205 writes the data read out from the DRAM 206 into second SRAM 803, provided in a second rearrangement control circuit 802.

The data written into the second SRAM 803 includes the dummy rows. As such, a dummy pixel deleting unit 805 in the second rearrangement control circuit 802 deletes data so that data read out from the second SRAM 803 is not output when that data corresponds to a dummy row. Thus as indicated by 812, the data output from the rearranging circuit 806 contains no dummy data, and furthermore has the same sequence as if the data had been read out from the image sensor 202 one row at a time.

The number of dummy rows inserted and the insertion position e.g., at the start or the end) are assumed to be set in the dummy pixel inserting unit 804 and the dummy pixel deleting unit 805 by the control unit 208. The dummy pixel inserting unit 804 inserts (adds) the set number of rows of dummy pixels at the set position. Meanwhile, the dummy pixel deleting unit 805 deletes the dummy pixels from the data stored in (or read out from) the second SRAM 803.

Figure 11:
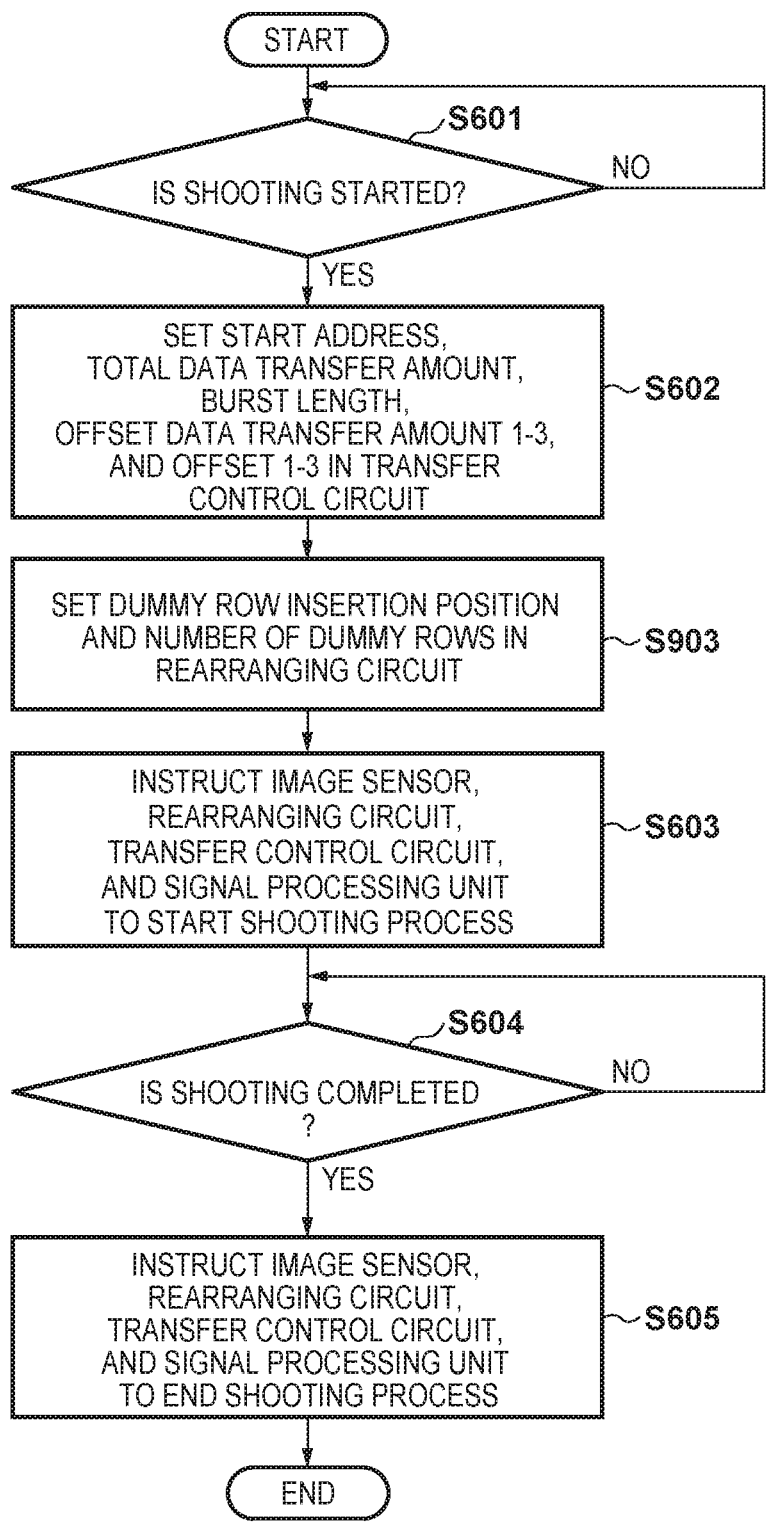
FIG. 11 is a flowchart pertaining to image capturing operations according to the second embodiment.

FIG. 11 is a flowchart pertaining to operations carried out when the digital camera 200 takes a shot, according to the present embodiment. Processes that are the same as in the first embodiment are given the same reference signs as in FIG. 6.

The steps aside from step S903 are the same as in the first embodiment. In step S903, the control unit 208 sets the dummy row insertion position and number of dummy rows in the rearranging circuit 806. Then, in step S603, the dummy pixel inserting unit 804 and the dummy pixel deleting unit 805 of the rearranging circuit 806 carry out the dummy insertion and deletion.

Specifically, in step S1303 of FIG. 9, the first rearrangement control circuit 800 of the rearranging circuit 806 inserts the dummy pixels into the obtained data using the dummy pixel inserting unit 804, and then records the data in the first SRAM 801 according to the sequence indicated by 810 in FIG. 10.

In step S1307, the second rearrangement control circuit 802 reads out the data sequentially from the starting address in the second SRAM 803. The dummy pixel deleting unit 805 then deletes the dummy pixels, and the data is output. Data having the same sequence as the sequence if the data had been read out from the image sensor 202 one row at a time is output from the rearranging circuit 806 as a result.

According to the present embodiment as described thus far, the same effects as those of the first embodiment can be achieved, even if the number of rows read out from the image sensor concurrently is not a multiple of the number of rows in the first unit of rearrangement in the first SRAM.

The present embodiment describes an example in which the number of rows in the first unit of rearrangement in the first SRAM is four, and two dummy rows are added when reading out 98 rows from the image sensor concurrently. However, the number of rows in the unit of rearrangement, the number of rows read out concurrently, and the number of dummy rows may be different values.

Additionally, although the present embodiment describes a configuration in which the rearranging circuit 804 includes the first SRAM 801 and the second SRAM 803, the SRAMs may be included in another function block instead, such as the image sensor 202 or the transfer control circuit 205.

Third Embodiment

A third embodiment of the present invention will be described next. Like the second embodiment, the present embodiment pertains to operations, carried out using the configuration described in the first embodiment, in which the number of rows read out from the image sensor 202 concurrently is not divisible by the number of rows in the first unit of rearrangement in the first SRAM. The present embodiment differs from the second embodiment in that dummy pixels are not used.

To clarify the differences from the second embodiment, a case where 98 rows at a time are read out from the image sensor 202 concurrently, and the data is, like in the first embodiment, rearranged in units of four rows in the first SRAM, will be described as an example here.

Figure 12:
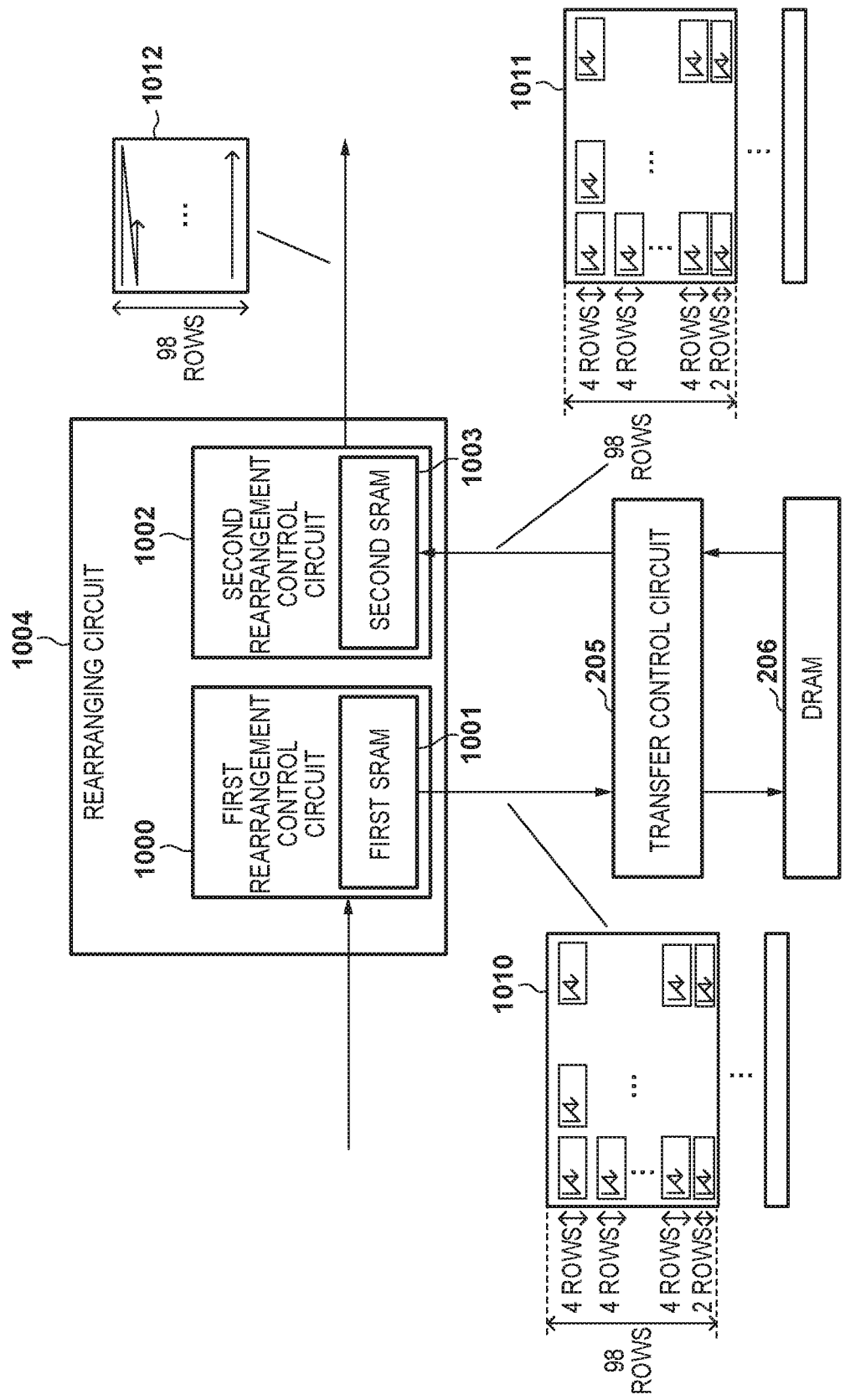
FIG. 12 is a diagram illustrating data rearrangement operations according to a third embodiment.

FIG. 12 is a diagram schematically illustrating the configuration according to the present embodiment, for rearranging 98 rows of data, which have been read out from the image sensor 202 concurrently, in the same order as if the data had been read out one row at a time. The configurations of the transfer control circuit 205 and the DRAM 206 are the same as in the first embodiment and will therefore not be described here. A rearranging circuit 1004 has the same configuration as in the first embodiment, but performs different operations.

A first rearrangement control circuit 1000 according to the present embodiment switches the unit of the number of rows for rearrangement partway along the 98 rows read out concurrently. The first rearrangement control circuit 1000 rearranges the data in units of four rows from the first to the 96th rows, and rearranges the data in units of two rows for the remaining 97th and 98th rows. The data for which the rearrangement is switched partway through is written into the DRAM 206 by the transfer control circuit 205, according to the sequence indicated by 1010.

The transfer control circuit 205 reads out the data from the DRAM 206 according to the sequence indicated by 1011, and writes the data into second SRAM 1003 in a second rearrangement control circuit 1002. For the data rearranged in units of two rows and written into the DRAM 206, the transfer control circuit 205 reads out the data in units of two rows and writes the data into the second SRAM 1003.

The position at which to switch the unit of rearrangement (e.g., the row number) and the unit of rearrangement after the change (the number of rows) are assumed to be set in the first rearrangement control circuit 1000 and the transfer control circuit 205 by the control unit 208. The first rearrangement control circuit 1000 changes the unit of the number of rows read out from first SRAM 1001 to the set number of rows starting from the set position Meanwhile, when reading out the data from the DRAM 206, with respect to the data for which the unit of rearrangement has been changed, the transfer control circuit 205 reads out the data in units of the post-change number of rows, and writes the data into the second SRAM 1003.

Figure 13:
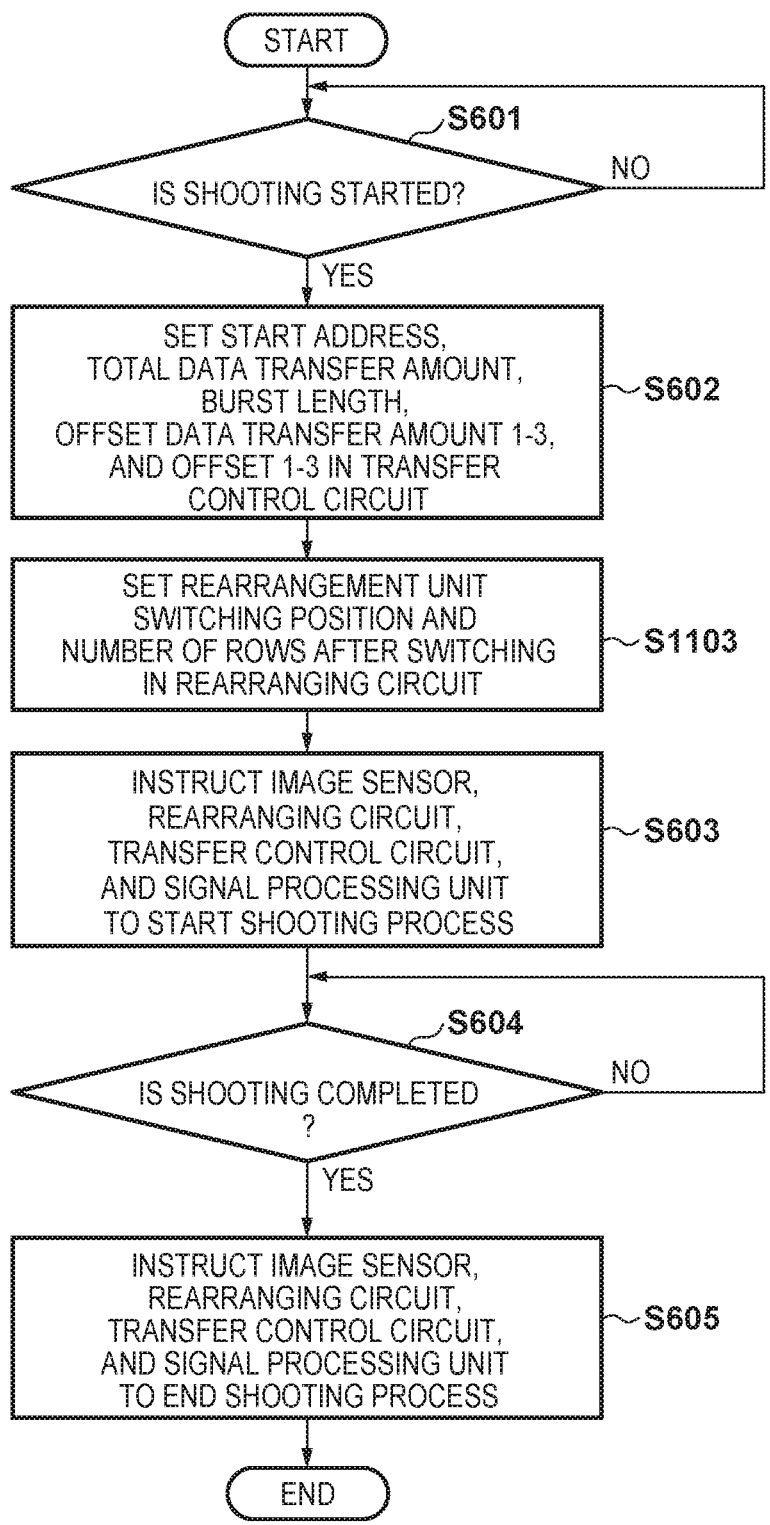
FIG. 13 is a flowchart pertaining to image capturing operations according to the third embodiment.

FIG. 13 is a flowchart pertaining to operations carried out when the digital camera 200 takes a shot, according to the present embodiment. Processes that are the same as in the first embodiment are given the same reference signs as in FIG. 6.

The steps aside from step S1103 are the same as in the first embodiment. In step S1103, the control unit 208 sets the position at which to switch the unit of rearrangement (e.g., the row number) and the unit of rearrangement after the change (the number of rows) in the first rearrangement control circuit 1000 and the transfer control circuit 205. Additionally, the transfer control circuit 205 sets an offset data transfer amount 1' and an offset 1', based on the unit of rearrangement after the change, in the first rearrangement control circuit 1000. Additionally, in step S603, the first rearrangement control circuit 1000 and the transfer control circuit 205 change the unit of rearrangement as described above.

Specifically, in step S1303 of FIG. 9, the first rearrangement control circuit 1000 of the rearranging circuit 1004 sets the number of rows corresponding to the unit of rearrangement to two rows for the data, among the obtained data, starting at the position where the unit of rearrangement is switched (the 97th row, here). The number of rows corresponding to the unit of rearrangement is four rows for the first to 96th rows. The transfer control circuit 205 then records the data into the DRAM 206 according to the sequence indicated by 1010 in FIG. 12.

Additionally, in step S1307, when reading out the data from the DRAM 206, the transfer control circuit 205 reads out the data according to the unit of rearrangement. Accordingly, when reading out the data from the rows for which the unit of rearrangement has been changed, the transfer control circuit 205 carries out the address control using the offset data transfer amount 1' and the offset 1', rather than the offset data transfer amount 1 and the offset 1.

The second rearrangement control circuit 102 reads out the data sequentially from the starting address in the second SRAM 1003. Data having the same sequence as the sequence if the data had been read out from the image sensor 202 one row at a time is output from the rearranging circuit 1004 as a result.

The same effects as those of the second embodiment are achieved by the present embodiment. The present embodiment describes an example in which the number of rows in the unit of rearrangement in the first SRAM is four, and the number of rows in the unit of rearrangement is changed from four to two when reading out 98 rows from the image sensor concurrently. However, the number of rows in the unit of rearrangement, the number of rows read out concurrently, and the number of rows in the unit of rearrangement after the change may be different values.

Additionally, although the present embodiment describes a configuration in which the rearranging circuit 1004 includes the first SRAM 1001 and the second SRAM 1003, the SRAMs may be included in another function block instead, such as the image sensor 202 or the transfer control circuit 205.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-186872, filed on Oct. 1, 2018, which is hereby incorporated by reference herein in its entirety.

What is claimed is:

1. An image processing apparatus comprising:
a first rearrangement control circuit that takes data read out in parallel from m rows ($2 \leq m < M$) of a region, of an image sensor, constituted by M rows and N columns of pixels, and stores n columns' worth ($2 \leq n < N$) of the read-out data in first memory;
a transfer control circuit that:
stores the M rows×N columns of pixels' worth of data in second memory by repeatedly storing in rows×n columns of pixels' worth of data, which is stored in the first memory, in the second memory in units of o rows×p columns of pixels ($2 \leq o < m$, $2 \leq p \leq n$), and
transfers, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and
a second rearrangement control circuit that, by outputting the data stored in the third memory one row at a time, outputs the data in the same sequence as 1 row×N columns of pixels in the image sensor.

2. The image processing apparatus according to claim 1, wherein the second memory has a burst mode, and the values of o and p are set to be no greater than a burst length set for the second memory.

3. The image processing apparatus according to claim 1, wherein the second memory has a burst mode, and the values of o and p are set to be equal to the burst length set for the second memory.

4. The image processing apparatus according to claim 1, wherein when m is not a multiple of o,
the first rearrangement control circuit inserts dummy data of a number of rows equal to m mod o, and stores n columns of pixels' worth of data in the first memory; and of the data stored in the third memory, the second rearrangement control circuit does not output the dummy data.

5. The image processing apparatus according to claim 1, wherein when m is not a multiple of o, the transfer control circuit changes the value of o partway through.

6. The image processing apparatus according to claim 1, wherein the first memory and the third memory are memory spaces having assigned sizes; and
the apparatus further comprises a control circuit that changes one or more of M, N, m, and the assigned sizes of the first memory and the third memory, in accordance with a shooting mode set in an image capturing apparatus that includes the image sensor.

7. The image processing apparatus according to claim 1, wherein the first memory and the third memory are memory spaces having assigned sizes; and
the apparatus further comprises a control circuit that changes the assigned sizes of the first memory and the third memory in accordance with the value of o.

8. The image processing apparatus according to claim 6, wherein the control circuit determines the value of o so that the minimum possible sizes are assigned to the first memory and the third memory.

9. The image processing apparatus according to claim 1, wherein the first memory and the third memory are constituted by SRAM, and the second memory is constituted by DRAM.

10. An image capturing apparatus comprising:
an image sensor;
an image processing apparatus that processes data read out from the image sensor, wherein the image processing apparatus comprises:
a first rearrangement control circuit that takes data read out in parallel from m rows ($2 \leq m < M$) of a region, of an image sensor, constituted by M rows and N columns of pixels, and stores n columns' worth ($2 \leq n < N$) of the read-out data in first memory;
a transfer control circuit that:
stores the M rows×N columns of pixels' worth of data in second memory by repeatedly storing m rows×n columns of pixels' worth of data, which is stored in the first memory, in the second memory in units of o rows×p columns of pixels ($2 \leq o < m$, $2 \leq p \leq n$), and
transfers, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and
a second rearrangement control circuit that, by outputting the data stored in the third memory one row at a time, outputs the data in the same sequence as 1 row×N columns of pixels in the image sensor; and
a signal processing circuit that processes data output by the second rearrangement control circuit of the image processing apparatus.

11. An image processing method executed by an image processing apparatus, the method comprising:
obtaining data read out in parallel from m rows ($2 \leq m < M$) of a region, of an image sensor, constituted by M rows and N columns of pixels, and storing n columns' worth ($2 \leq n < N$) of the read-out data in first memory;
storing the M rows×N columns of pixels' worth of data in second memory by repeatedly storing m rows×n columns of pixels' worth of data, which is stored in the first memory, in the second memory in units of o rows×p columns of pixels (2≤o<m, 2≤p≤n);

transferring, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and by outputting the data stored in the third memory one row at a time, outputting the data in the same sequence as 1 row×N columns of pixels in the image sensor.

12. A non-transitory computer-readable medium that stores a program, wherein the program, when executed by one or more processors, causes the one or more processors to function as an image processing apparatus comprising:

a first rearrangement control unit that takes data read out in parallel from m rows (2≤m<M) of a region, of an image sensor, constituted by M rows and N columns of pixels, and stores n columns' worth (2≤n<N) of the read-out data in first memory;

a transfer control unit that:

stores the M rows×N columns of pixels' worth of data in second memory by repeatedly storing m rows×n columns of pixels' worth of data, which is stored in the first memory, in the second memory in units of o rows×p columns of pixels (2≤o<m, 2≤p≤n), and transfers, from the second memory, the M rows×N columns of pixels' worth of data, which is stored in the second memory, to third memory by repeatedly storing the o rows×p columns of pixels' worth of data in the third memory so as to have the same sequence as the o rows×N columns of pixels in the image sensor; and a second rearrangement control unit that, by outputting the data stored in the third memory one row at a time, outputs the data in the same sequence as 1 row×N columns of pixels in the image sensor.

* * * * *